US011157131B2

(12) United States Patent
Lee et al.

(10) Patent No.: US 11,157,131 B2
(45) Date of Patent: Oct. 26, 2021

(54) VIRTUAL REALITY-BASED RADIOLOGY PRACTICE APPARATUS AND METHOD

(71) Applicant: VRAD INC., Hanam-si (KR)

(72) Inventors: Heasuk Lee, Hanam-si (KR); Eunil Cho, Hanam-si (KR)

(73) Assignee: VRAD INC., Hanam-si (KR)

( * ) Notice: Subject to any disclaimer, the term of this patent is extended or adjusted under 35 U.S.C. 154(b) by 0 days.

(21) Appl. No.: 16/488,841

(22) PCT Filed: Feb. 26, 2018

(86) PCT No.: PCT/KR2018/002313
§ 371 (c)(1),
(2) Date: Aug. 26, 2019

(87) PCT Pub. No.: WO2018/155973
PCT Pub. Date: Aug. 30, 2018

(65) Prior Publication Data
US 2020/0333940 A1 Oct. 22, 2020

(30) Foreign Application Priority Data
Feb. 24, 2017 (KR) .......................... 10-2017-0024721

(51) Int. Cl.
*G06F 3/0481* (2013.01)
*G02B 27/00* (2006.01)
(Continued)

(52) U.S. Cl.
CPC ..... *G06F 3/04815* (2013.01); *G02B 27/0093* (2013.01); *G02B 27/017* (2013.01);
(Continued)

(58) Field of Classification Search
CPC ...... G06F 3/04815; G06F 3/011; G06F 3/017; G06F 3/016; G06F 3/012; G02B 27/017;
(Continued)

(56) References Cited

U.S. PATENT DOCUMENTS 9,881,520 B2   1/2018 Ullrich et al.
2002/0186820 A1* 12/2002 Saito ...................... G16H 50/50
378/210
(Continued)

FOREIGN PATENT DOCUMENTS

CN   106293082 A   1/2017
JP   2009069918 A   4/2009
(Continued)

OTHER PUBLICATIONS

Ali A. Alghamdi, "Simulation System for Radiology Education integration of physical and virtual realities", Apr. 20, 2015, SNE-journal.org, All Pages (Year: 2015).*
(Continued)

*Primary Examiner* — Roberto Borja
(74) *Attorney, Agent, or Firm* — Rabin & Berdo, P.C.

(57) ABSTRACT

The present invention relates to a virtual reality-based radiology practice apparatus and method in which the practiser is equipped with a head-mounted display (HMD), wears hand-mounted unit in the hands, manipulates virtual radiography equipment and performs virtual radiation practice in a virtual radiation practice environment provided on audiovisual virtual reality, and the hand motion controller receives the position and angle of the hands of the practiser from the hand-mounted unit, causes the virtual radiography equipment operate, and outputs specific results virtually as the virtual radiography equipment is operated.

The virtual radiology practice apparatus of the present invention is characterized by comprising a HMD head-mounting unit, HMD hand-mounted unit, HMD controller, and main server that is detailed as follows: the HMD head-mounting unit that is mounted on the head of the practiser and outputs images containing virtual radiography equipment to the HMD image output unit for virtual radiology practice; the HMD hand-mounted unit that is mounted
(Continued)

in the hands of the practiser and contains the hand movement detection unit which detects the hand movement signals of the practiser as the hands of the practiser move to manipulate the virtual radiography equipment on the image; the HMD controller that receives the hand movement signals from the HMD hand-mounted unit, sends it to the main server, and sends the image received from the main server to the HMD head-mounting unit; the main server that receives the hand movement signals from the HMD controller, moves the hand movement indicator which is the virtual hand of the practiser according to the hand movement signals on the image, and sends the image containing the moved hand movement indicator to the HMD controller.

18 Claims, 16 Drawing Sheets

(51) Int. Cl.
| | |
|---|---|
| G02B 27/01 | (2006.01) |
| G06F 3/01 | (2006.01) |
| G06T 15/08 | (2011.01) |
| G06T 17/20 | (2006.01) |
| G06T 19/00 | (2011.01) |
| G06T 19/20 | (2011.01) |
| G09B 23/28 | (2006.01) |

(52) U.S. Cl.
CPC .......... *G02B 27/0172* (2013.01); *G06F 3/011* (2013.01); *G06F 3/012* (2013.01); *G06F 3/016* (2013.01); *G06F 3/017* (2013.01); *G06T 15/08* (2013.01); *G06T 17/20* (2013.01); *G06T 19/003* (2013.01); *G06T 19/20* (2013.01); *G09B 23/28* (2013.01); *G02B 2027/0138* (2013.01); *G06T 2207/10072* (2013.01); *G06T 2207/20084* (2013.01)

(58) Field of Classification Search
CPC ............ G02B 27/0172; G02B 27/0093; G02B 2027/0138; G09B 23/28; G06T 19/20; G06T 19/003; G06T 15/08; G06T 17/20; G06T 2207/10072; G06T 2207/20084
See application file for complete search history.

(56) References Cited

U.S. PATENT DOCUMENTS

| | | | |
|---|---|---|---|
| 2004/0224294 | A1 | 11/2004 | Heininger et al. |
| 2005/0162624 | A1* | 7/2005 | Miyasaka ............ G03B 21/142 353/101 |
| 2007/0048702 | A1* | 3/2007 | Jang ...................... G09B 19/00 434/224 |
| 2016/0180595 | A1 | 6/2016 | Grossinger et al. |
| 2016/0206273 | A1* | 7/2016 | Fukuda .................. A61B 6/025 |
| 2017/0354864 | A1* | 12/2017 | Rogers .................. A63F 13/245 |
| 2018/0061058 | A1* | 3/2018 | Xu ........................ G06N 3/0454 |
| 2018/0136465 | A1 | 3/2018 | Chi et al. |
| 2018/0098583 | A1* | 4/2018 | Keller ................ A41D 19/0024 |
| 2018/0137782 | A1 | 5/2018 | Ullrich et al. |
| 2018/0190003 | A1* | 7/2018 | Upadhyay ............. G06T 19/003 |

FOREIGN PATENT DOCUMENTS

| | | | |
|---|---|---|---|
| JP | 2009-238228 | A | 10/2009 |
| JP | 2016-145978 | A | 8/2016 |
| JP | 6049788 | B2 | 12/2016 |
| KR | 10-2003-0044909 | A | 6/2003 |
| KR | 10-2007-0023905 | A | 3/2007 |
| KR | 100721713 | B1 | 5/2007 |
| KR | 10-2009-0078487 | A | 7/2009 |
| KR | 10-0967950 | B1 | 7/2010 |
| KR | 10-1151054 | B1 | 6/2012 |
| KR | 10-2012-0122542 | A | 11/2012 |
| KR | 10-2016-0128119 | A | 11/2016 |

OTHER PUBLICATIONS

Shaderware, "ProjectionVR v5.0 User Guide", Sep. 8, 2015, Shaderware.com, All Pages (Year: 2015).*
Chinese Office Action dated Mar. 23, 2021.
Korean Office Action dated Nov. 21, 2020.

* cited by examiner

VIRTUAL REALITY-BASED RADIOLOGY PRACTICE APPARATUS AND METHOD

TECHNICAL FIELD

The present invention relates to a virtual reality-based radiology practice apparatus and method in which the practiser is equipped with head-mounted display (HMD), wears hand-mounted unit in the hands, manipulates virtual radiography equipment and performs virtual radiation practice in the virtual radiation practice environment on audiovisual virtual reality, and in which the hand motion controller receives the position and angle of the hands of the practiser from the hand-mounted unit, causes the virtual radiography equipment operate, and outputs specific results virtually as the virtual radiography equipment is operated.

BACKGROUND ART

In general, radiation equipment is highly dangerous because the users can be exposed to radiation, so it requires highly skilled personnel to handle it.

There are various devices such as a gamma camera, computerized tomographic apparatus (camera), a thyroid measuring device, an X-ray device, a linear accelerator, a cyclotron. The method of handling the equipment varies depending on the manufacturer in many cases even for the same kind of radiation equipment.

Future medical professionals need to know as much as possible about the medical radiation equipment that is directly connected to the life of a person.

However, these medical radiation devices are quite expensive, take up a lot of space because of their large size, and also require a professional manager to manage them. Thus, in general, it is not easy for schools or departments in need of radiology practice to have all of this equipment.

Until now, radiology practice has been performed using actual radiology equipment and manikins in schools or departments in need of the radiology practice. Therefore, the practisers or the educators may be exposed to radiation.

Therefore, there is a need for radiology practice equipment that can perform various applications using various medical radiation equipment at low cost and at no risk of exposure to radiation.

To this end, the present invention proposes a virtual reality-based radiology practice apparatus.

If performing radiology practice in virtual reality, it is not possible to become proficient as a practiser who actually handles radiation equipment as it merely entails seeing and not hands-on practice.

Therefore, it is desirable to perform the same virtual practice as the actual practice in which practisers manipulate radiography equipment and obtain specific outputs through the results of operation in virtual reality.

Therefore, the present invention proposes a virtual reality-based radiology practice apparatus and method in which the practiser is equipped with a head-mounted display (HMD), wears a hand-mounted unit in the hands, manipulates virtual radiography equipment and performs virtual radiation practice in a virtual radiation practice environment provided on audiovisual virtual reality, and the hand motion controller receives the position and angle of the hands of the practiser from the hand-mounted unit, causes the virtual radiography equipment operate, and outputs a specific result virtually as the virtual radiography equipment is operated.

As a prior technology, there is "System and method for virtual reality training for odontology" in Korean Patent Laid-Open Publication No. 2003-0044909.

As shown in FIG. 1, the above prior invention relates to a virtual reality practice system for obtaining procedural mobility in dentistry, which senses data about the spatial position of the actual element (2) that can be held and handled by hand, displays a three-dimensional representation of the virtual object (T) on the screen (7), causes the computer (6) to process spatial position data to provide a spatial representation of the virtual device (OV) corresponding to the actual spatial location of the actual element (2), provides a virtual device (01-04) that runs on a virtual object (T), and models the interaction between the virtual object (T) and the virtual device. The hand-held element (2) belongs to the tactile human-machine interface (IHM) device (1) that has an actuator controlled to provide force feedback to the user holding the actual element (2) when the virtual device (OV) interacts with the virtual object (T). That is, the hand-held actual element (2), a probe hand tool or the like, it is mounted on the free end of the articulated arm (3) of the tactile interface device (1), which feedbacks a specific force to the hand-held actual element (2) when the virtual device (OV) interacts with the virtual object (T).

Korean Patent Laid-Open Publication No. 2003-0044909 is about dental equipment in which practisers do not need to move a lot, practice in one place, do not have a variety of virtual patients, and practice in a different environment that is far from the actual practice environment.

That is, Korean Patent Laid-Open Publication No. 2003-0044909 does not have the virtual radiography equipment, and it is not possible to practice with various virtual patients, and it is difficult for the practiser to practically manipulate the virtual radiography equipment by hand in virtual radiation practice.

DISCLOSURE

Technical Problems

The agenda that the present invention aims to solve is to provide a virtual reality-based radiology practice apparatus and method in which the practiser is equipped with a head-mounted display (HMD), wears a hand-mounted unit in the hands, manipulates virtual radiography equipment and performs virtual radiation practice in a virtual radiation practice environment on audiovisual virtual reality, and the hand motion controller receives the position and angle of the hands of the practiser from the hand-mounted unit, causes the virtual radiography equipment operate, and outputs specific results virtually as the virtual radiography equipment is operated.

Another agenda that the present invention aims to solve is to provide a virtual reality-based radiology practice apparatus and method by which it is possible to manipulate diverse virtual radiography equipment in tune with various types of virtual patients or various virtual imaging objects in virtual reality, and to verify the results of the practice virtually.

Another agenda that the present invention aims to solve is to provide a virtual reality-based radiology practice apparatus and method which can display the images that a specific practiser performs in virtual practice on an ordinary display so that it can be seen by other practisers or educators.

Technical Solution

In order to solve the above agenda, the virtual radiology practice apparatus of the present invention is characterized by comprising a HMD head-mounting unit, a HMD hand-mounted unit, a HMD controller, and a main server that is detailed as follows: the HMD head-mounting unit that is mounted on the head of the practiser (learner or trainee or user) and outputs an image containing virtual radiography equipment to the HMD image output unit for virtual radiology practice; the HMD hand-mounted unit that is mounted in the hands of the practiser and contains the hand movement detection unit which detects the hand movement signals of the practiser as the hands of the practiser move to manipulate the virtual radiography equipment on the image; the HMD controller that receives the hand movement signals from the HMD hand-mounted unit, sends it to the main server, and sends the image received from the main server to the HMD head-mounting unit; the main server that receives the hand movement signals from the HMD controller, moves the hand movement indicator which is the virtual hand of the practiser which accords to the hand movement signals on the image and sends the image containing the moved hand movement indicator to the HMD controller.

The HMD head-mounting unit additionally includes an earphone for outputting sound signals received from the main server via the HMD controller. The HMD hand-mounted unit additionally includes a trigger button for indicating that the virtual object colliding with the hand movement indicator in the image is held by the hand movement indicator on the image.

If the part of the virtual object colliding with the hand movement indicator is a actor (moveable part), the main server causes the actor of the virtual object to move according to the movement of the hand movement indicator on the image when trigger signals are received from the trigger button on the main server via the HMD controller.

The HMD hand-mounted unit additionally includes a vibration generating unit for outputting vibration when the hand movement indicator collides with a virtual object on the image. The HMD head-mounting unit additionally includes a head movement detection unit that detects the head movement of the practiser.

The main server receives the head movement signals from the head movement detection unit through the HMD controller, creates an image that changes the viewpoint of the image according to the head movement signals, and sends it to the HMD controller.

The virtual radiology practice apparatus additionally includes a camera unit for photographing the practiser to generate the position tracking image. The main server generates an image according to the position tracking image, head movement signals, and hand movement signals that have been received from the camera unit through the HMD controller and transmits it to the HMD controller.

The HMD hand-mounted unit additionally includes a FBLR (Forward/Backward/Left/Right) button (trackpad) signal. When the main server receives the FBLR button signal output from the FBLR button through the HMD controller, the main server creates an image that the practiser is moved in the direction of the head movement signals on the image, as a image that show for the practiser, and sends it to the HMD controller.

The head movement signals, position tracking image, and hand movement signals are the signals that are detected in synchronization with the infrared emission of the base station unit.

The apparatus additionally includes the setting units that allow the practiser to set a Virtual radiography equipment or virtual patient.

In addition, the driving method of the virtual radiology practice apparatus of this invention is characterized by the following features: the image output unit of the HMD (Head Mounted Display) mounted on the practiser's head outputs an image containing virtual radiography equipment for virtual radiology practice; In order to manipulate virtual radiography equipment on the image, the hand movement detection unit of the HMD hand-mounted unit mounted in the hands of a practiser detects the hand movement signals of the practiser when the practiser's hand moves and sends it to the main server's operating processing unit (hereinafter referred to as the operating processing unit) via the HMD controller; the operating processing unit moves the hand movement indicator which is the practiser's virtual hand on the image, in accordance with the received hand movement signals, and outputs the image containing the moved hand movement indicator to the image output unit of the HMD head-mounting unit through the HMD controller.

Also, the driving method of the virtual radiology practice apparatus of this invention includes the following steps performed by the main server's operating processing unit: the signal receiving step, wherein the operating processing unit of the main server receives, through the HMD controller, a head movement signal that is detected from the head movement detection unit mounted on the HMD head-mounting unit, a hand movement signal that is detected from the hand movement detection unit of the HMD hand-mounted unit, and a position tracking image that the camera unit generates by image-shooting the practiser; the view adjustment and hand movement indicator displaying step, wherein the operating processing unit of main server determines the view of the practiser according to the head movement signal, outputs an image of a preset virtual practice environment that adjusted the image according to the view of practiser, and displays the hand movement indicator, that is, the practiser's virtual hand, at a position according to the hand movement signals or a hand position according to position tracking image signal, on the image of the virtual practice environment; the step of checking interaction condition for movement, wherein the operating processing unit of the main server determines whether an input button signal has been received according to the selection of the input button of the HMD hand-mounted unit, and determines whether the hand movement indicator has collided with the virtual radiography equipment; and, interaction execution step, wherein the operating processing unit of main server performs the operation according to the input button signal if the input button signal is input in the step of checking interaction condition for movement, and wherein the operating processing unit of main server generates a vibration output control signal if the hand movement indicator collides with the virtual radiography equipment in the step of checking interaction condition for movement, and transmits the vibration output control signal to the HMD control unit.

Also, the driving method of the virtual radiology practice apparatus of this invention includes the following steps performed by the main server's operating processing unit: the practice execution step, wherein on the imaging, according to the movement of the hand movement indicator, which moves according to the practiser's hand movement signals, the operating processing unit of the main server arranges the virtual film on the imaging region of the virtual patient who has been moved to the position for imaging, adjusts the position and angle of the virtual radiography equipment, and drives the virtual radiography equipment to proceed with virtual image-shooting exercises; and, the step of outputting the results of the virtual practice, wherein after the practice execution step, the operating processing unit of main server virtually develops the film removed from the virtual patient according to the hand movement indicator if the hand movement indicator has collided with a virtual result screen monitor, and displays the photograph virtually developed from the film on the virtual result screen monitor.

The driving method of the virtual radiology practice apparatus further includes the following steps before the practice execution step: a step of moving to the virtual lab, wherein the operating processing unit of the main server transmits an image of the virtual radiography room to the HMD image output unit via the HMD controller when on the image, the practiser moves to the virtual radiography room; and, a virtual patient setting step, wherein after the step of moving to the virtual lab, the operating processing unit of the main server displays a patient selection dialog, and transmits the virtual patient image set by the practiser to the HMD image output unit via the HMD controller.

Also, the driving method of the virtual radiology practice apparatus of this invention includes the following steps performed by the main server's operating processing unit: a hand movement signals receiving step, wherein if the hand movement indicator collides with the actor of the object on the image and the operating processing unit of the main server receives a trigger signal from the trigger button of the HMD hand-mounted unit via the HMD controller, the operating processing unit of the main server, determines that the practiser has been trying to catch the virtual object, receives a hand movement signal from the hand movement detection unit of the HMD hand-mounted unit, and stores the hand movement signal in the memory unit; and, a step of moving the actor, wherein if trigger signals has been received from the trigger button of the HMD hand-mounted unit via the HMD controller, the operating processing unit of the main server receives the current hand movement signal from the hand movement detection unit of HMD hand-mounted unit, and moves the actor of the virtual object according to the comparison result that the current hand movement signal compares to the previous hand signal.

Also, the driving method of the virtual radiology practice apparatus of this invention includes the following steps performed by the main server's operating processing unit: a step of checking reception of FBLR button signal, wherein the operating processing unit of the main server determines whether or not the FBLR button signals are received from the FBLR button (trackpad) of the HMD hand-mounted unit via the HMD controller; a step of calculating collision point with the ground, wherein, if the operating processing unit of the main server receives the FBLR button signals, the operating processing unit of the main server receives the hand movement signals that consist of the position and the angle value of the hand from the hand movement detection unit of the HMD hand-mounted unit, and calculates the collision point with the ground on the extension line of the direction according to the position and the angle of the hand movement signals; a step of receiving the head movement signals, wherein the operating processing unit of the main server receives the head movement signals that consist of the position and the angle value of the head from the HMD controller and determines the direction that the practiser's head is facing; and a step of displaying teleport point based on collision point, wherein the operating processing unit of the main server displays the teleport point based on collision point and displays the direction of the practiser's view.

The driving method of the virtual radiology practice apparatus further includes the following steps: a step of checking reception of grab button signal, wherein the operating processing unit of the main server determines whether or not the grab button signals have been received from the grab button of the HMD hand-mounted unit, after the step of displaying teleport point based on collision point; a step of checking re-reception of FBLR button signal wherein if the grab button signals have not been received in the step of checking reception of grab button signal, the operating processing unit of the main server determines whether the FBLR button signals have been received again from the FBLR button of the HMD hand-mounted unit, and wherein if the FBLR button signals have not been received again, the operating processing unit of main server goes back to the step of calculating collision point with the ground; a position movement execution step, wherein the operating processing unit of the main server generates an image that moved the direction and position of the practiser to the practiser's looking direction and the teleport point obtained in the step of displaying teleport point based on collision point, and transmits the generated image to the HMD controller; and a step of cancelling the teleport point display, wherein if the grab button signals have been received after the position movement execution step or in the step of checking reception of grab button signal, the operating processing unit of the main server cancels the teleport point obtained in the step of displaying teleport point based on collision point.

The present invention is characterized in that the method for driving virtual radiology practice apparatus comprises the following steps that create and display a virtual patient before implementing a virtual practice: a step in which the operating processing unit of the main server sends the medical image data consisting of MRI scan data or CT scan data to the image processing server; a step in which the image processing server performs image segmentation of the medical image data received from the main server using the deep artificial neural network structure, uses the segmented image to calculate the mesh data (surface information data) of the organ or tissue, and transmits the calculated organ or tissue surface information data (mesh data) to the main server; and, a step in which the main server converts the received mesh data of a specific part of the virtual patient into the mesh data of the 3D model and displays the virtual patient.

Furthermore, the present invention is characterized in that the driving method of the virtual radiology practice apparatus includes the following steps in which the main server generates a virtual radiation image-shooting result screen after the virtual practice ends: a step of reading the relative position of imaging object, imaging machine, and film, wherein the operating processing unit of the main server reads the relative position and angle values of the imaging object, imaging machine, and film; a CT scan data loading step, wherein the operating processing unit of the main server reads the CT scan data of the set patient from the database; a 3D modeling step of CT scan data, wherein the operating processing unit of the main server performs three-dimensional modeling of the CT scan data through volume rendering; and, a radiographic image generation step, wherein according to the relative positions of the 3D model, the film, and the imaging machine in step for loading CT scan data, the 3D data of the 3D model between the imaging machine and the film is projected (transmitted) through a two-dimensional plane to generate radiographs.

Also, the present invention is characterized in that the driving method of the virtual radiology practice apparatus includes the following steps in which the main server generates a virtual radiation image-shooting result screen after the virtual practice ends: a step of reading the relative position of imaging object, imaging machine, and film, wherein the operating processing unit of the main server reads the relative position and angle values of the imaging object, imaging machine, and film; a radiographic loading step, wherein the operating processing unit of the main server reads the target site radiographs of the set patient from the database; a step of resizing the original radiograph, wherein the operating processing unit of the main server projects the original radiograph, which is the target site radiograph, reads in the radiographic loading step, moves it in the direction parallel to the imaging machine, and enlarges or reduces the size of the image of the radiograph according to the projection; a step of checking the existence of a contact point, wherein after the step of resizing the original radiograph, the operating processing unit of the main server judges whether the projected photograph and the film have a contact point, and causes the process to return to the step of resizing the original radiograph if there is no contact point; and, a pixel value storing step, wherein if there is a contact point in the step for checking existence of a contact point, the operating processing unit of the main server copies the pixel value of the projected photograph of the contact into the buffer storing the results photograph.

The driving method of the virtual radiology practice apparatus additionally includes a step of checking departure from film area wherein the operating processing unit of the main server checks whether or not the projected image is out of the film area, and returns the process to the step of resizing the original radiograph if it is not out of the film area, and the process ends if it is out of the film area.

Advantageous Effects

In the present invention, the practiser is equipped with a head-mounted display (HMD), wears a hand-mounted unit in the hands, manipulates virtual radiography equipment and performs a virtual radiation practice in the virtual radiation practice environment provided on audiovisual virtual reality, and causes the hand motion controller to receive the position and angle of the hands of the practiser from the hand-mounted unit, causes the virtual radiography equipment to operate, and outputs specific results virtually as the virtual radiography equipment is operated. Thus, the present invention allows practisers to perform the practices in the same way they do in a real environment, but allows the practisers and educators to not be exposed to radiation.

The present invention can allow practisers to be able to manipulate diverse virtual radiography equipment in tune with various types of virtual patients or various virtual imaging objects in virtual reality and see the results of the operation virtually.

In other words, the present invention can allow for the conventional imaging method using actual radiography equipment and manikin in existing radiology practice to be practiced through virtual imaging equipment and various virtual patients in virtual reality. Thus, the problems of existing radiology practice methods, direct exposure to radiation, high cost of operating a practice lab, and limited practice experience can be solved.

The present invention is also applicable to oral radiology practice and the like.

The present invention can also allow for a virtual practice execution image of a specific practiser to be displayed on a general display for other practisers or educators to see it so that the practiser can perform virtual practice depending on the educator's education and hear another practiser's advice.

MODE FOR INVENTION

Hereinafter, the virtual reality-based radiology practice apparatus and method of the present invention will be described in detail with reference to the accompanying drawings.

Figure 1:
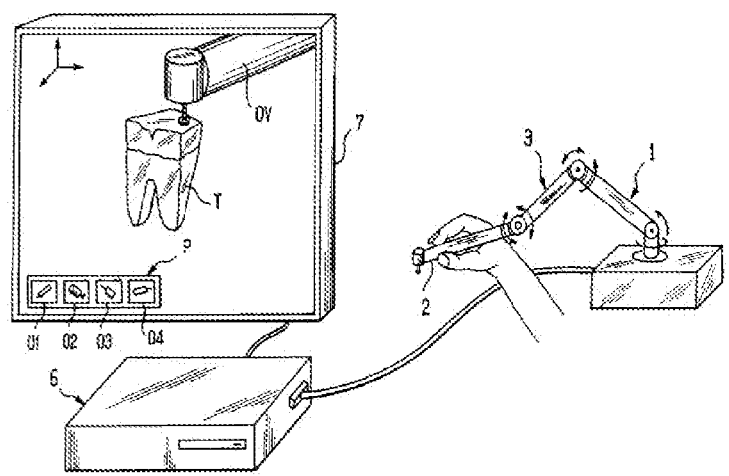
FIG. 1 is a block diagram of a virtual reality practice system of Korean Patent Laid-Open Publication No. 2003-0044909.
Figure 2:
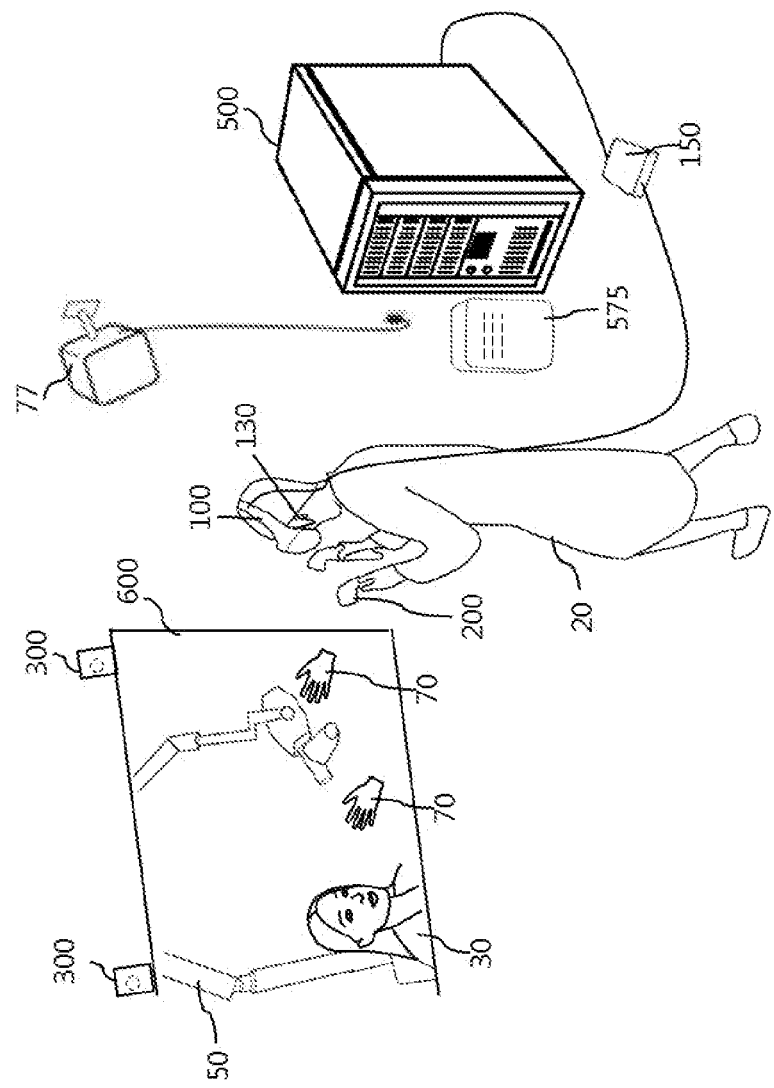
FIG. 2 is a schematic diagram for explaining a virtual reality-based radiology practice apparatus of the present invention.
Figure 3:
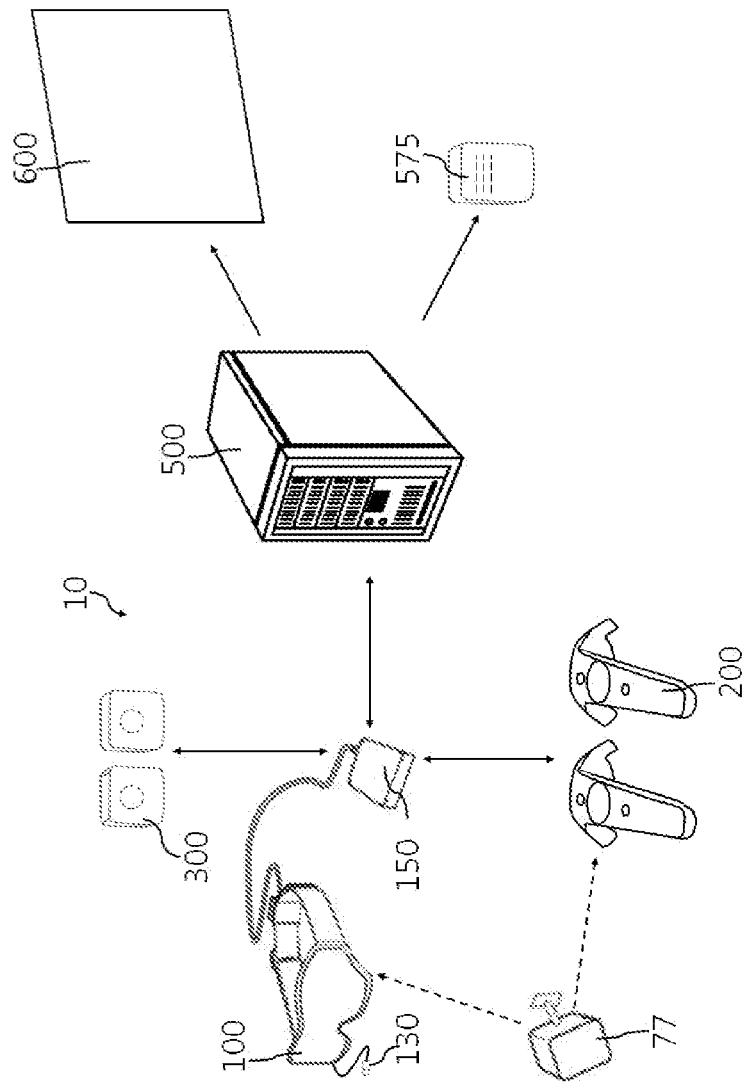
FIG. 3 is a schematic diagram for explaining a driving method of the virtual reality-based radiology practice apparatus of FIG. 2.

FIG. 2 is a schematic diagram for explaining the virtual reality-based virtual radiology practice apparatus of the present invention, and FIG. 3 is a schematic diagram for explaining the driving method of virtual reality-based virtual radiology practice apparatus of FIG. 2.

In this invention, the base station unit (77), HMD head-mounting unit (100), HMD controller (Link Box) (150), HMD hand-mounted unit (200), and Camera unit (300) constitute one set, i.e. HMD set (76). Here, the HMD set (76) may use a commercially available HMD set.

As shown in FIG. 2, the practiser (20) wears the HMD head-mounting unit (100) on his/her head, and wears the HMD hand-mounted (namely, hand motion controller) unit on his/her hands or hold the HMD hand-mounted unit in his/her hands. Then, the practiser (20) can practice or listen to a lecture while viewing the image displayed on the HMD head-mounting unit (100) and listening to the sound through the earphones (130) connected to the HMD head-mounting unit (100). At this time, the image displayed on the HMD head-mounting unit (100) is directly displayed on the display unit (600) located outside, and the sound of the earphones (130) connected to the HMD head-mounting unit (100) is output on the speaker unit (575) located outside.

The camera unit (300) includes a position tracking (motion tracking) sensing camera or more, captures the movement image of the practiser (20), that is, shoots the practiser's image, and transmits it to the HMD controller (150). The HMD controller (150) transmits this image to the main server (500) or detects the position tracking (motion tracking) signals according to the movement of the practiser (user) from the practiser's image and transmits them to the main server (500).

In the HMD head-mounting unit (100) and the display unit (600), the hand-shaped hand movement indicator (70) is displayed and the hand movement indicator (70) is moved on the screen of the display unit (600), that is, in the virtual practice environment, corresponding to the hands of the practiser (20), i.e., the motion signals of the HMD hand-mounted unit (200). In response to the movement of the hand movement indicator (70), a specific actor of the displayed virtual radiography equipment (50) may move, or a displayed specific setting switch may be selected. At this time, when the hand movement indicator (70) of the practiser (20) comes into contact with the virtual radiography equipment (50) or the like or catches the virtual radiography equipment (50) or the like, the vibration indicating the contact is felt through the vibration generating unit (230) of the HMD hand-mounted unit (200).

The HMD head-mounting unit (100) outputs image signals and sound signals that are received from the main server (500) via the HMD controller (150) to the HMD image output unit (120) and the earphones (130), transmits the head movement signals that are detected from the head movement detection unit (110) mounted on the HMD head-mounting unit (100) to the main server (500) via the HMD controller (150). Here, the head movement signals represent the direction the practiser (20) is facing or the direction the practiser (20) is looking at.

The HMD head-mounting unit (100) and the display unit (600), received the virtual radiography equipment (50) image from the main server (500) via the HMD controller (150) in accordance with the selected practice mode. Also, the HMD head-mounting unit (100) and the display unit (600), may be displayed a specific virtual patient (30) image that is received from the main server (500) via the HMD controller (150) according to the user's setting in the setting unit of the virtual radiology practice apparatus.

Here, the virtual radiography equipment (50) in FIG. 2 represents an intraoral X-ray machine, but it is not intended to limit the present invention to this. The virtual radiography equipment (50) may be a virtual radiotherapy device or virtual radiography apparatus, such as a digital X-ray machine, an angiography machine, a CT scanner, an MRI machine, an intraoral X-ray machine, an extraoral X-ray machine, a panoramic radiography machine, or mammography machine.

Figure 12:
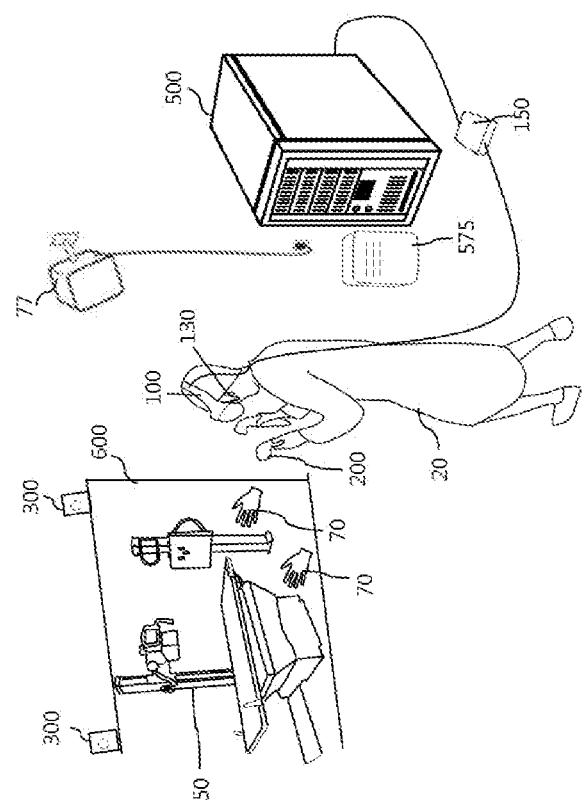
FIG. 12 and FIG. 13 are schematic diagrams explaining the virtual reality-based radiology practice apparatus of FIG. 2, where the Virtual radiography equipment is a digital x-ray device.
Figure 13:
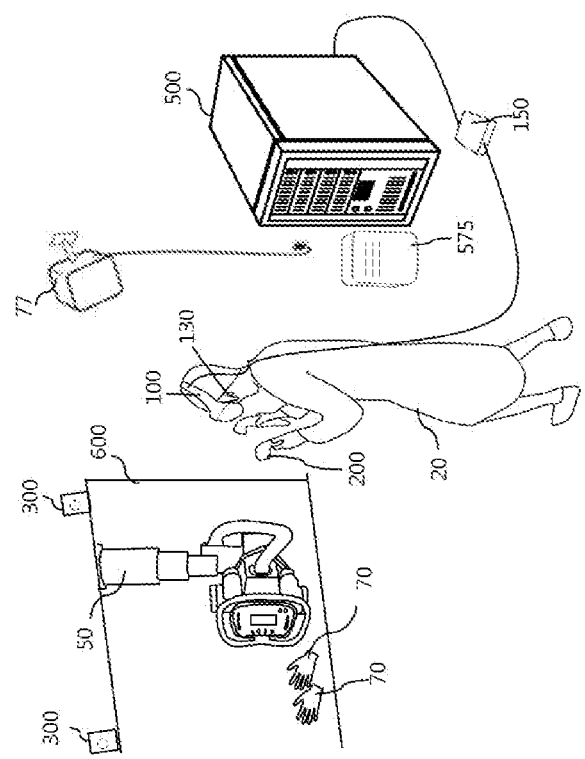
Figure 14:
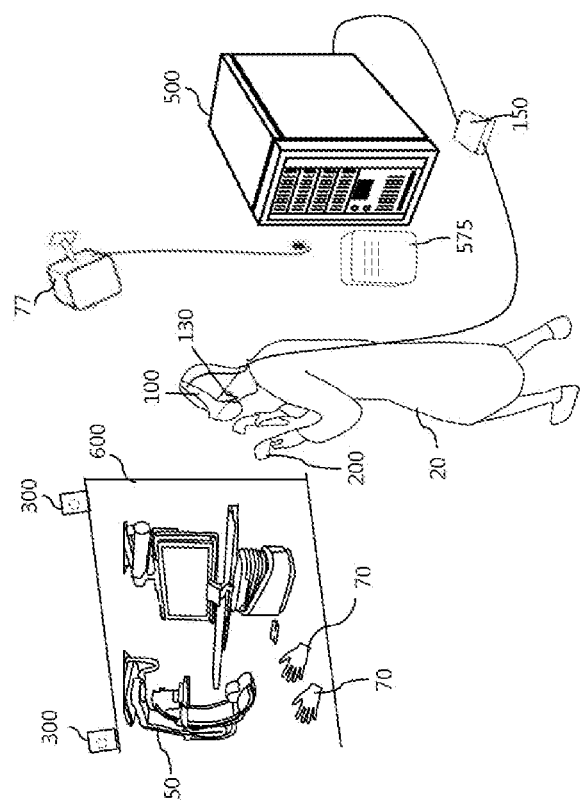
FIG. 14 and FIG. 15 are schematic diagrams explaining the virtual reality-based radiology practice apparatus of FIG. 2, where the Virtual radiography equipment is an angiography machine.
Figure 15:
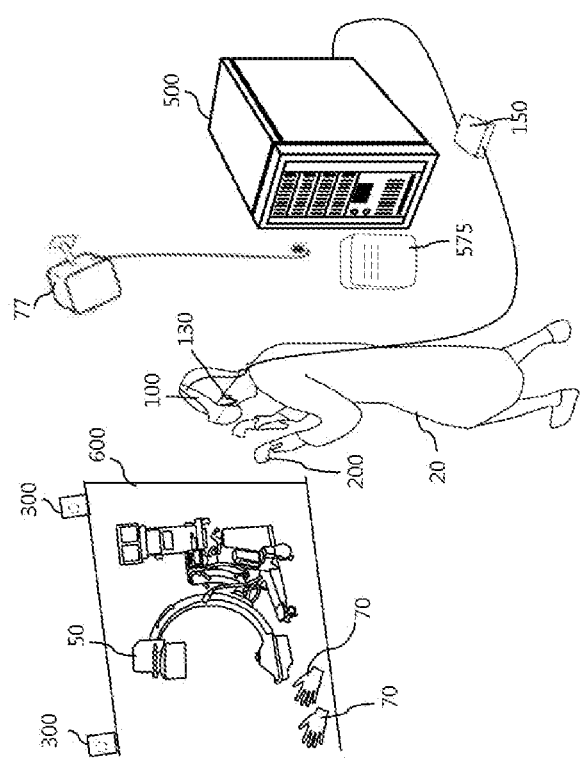
Figure 16:
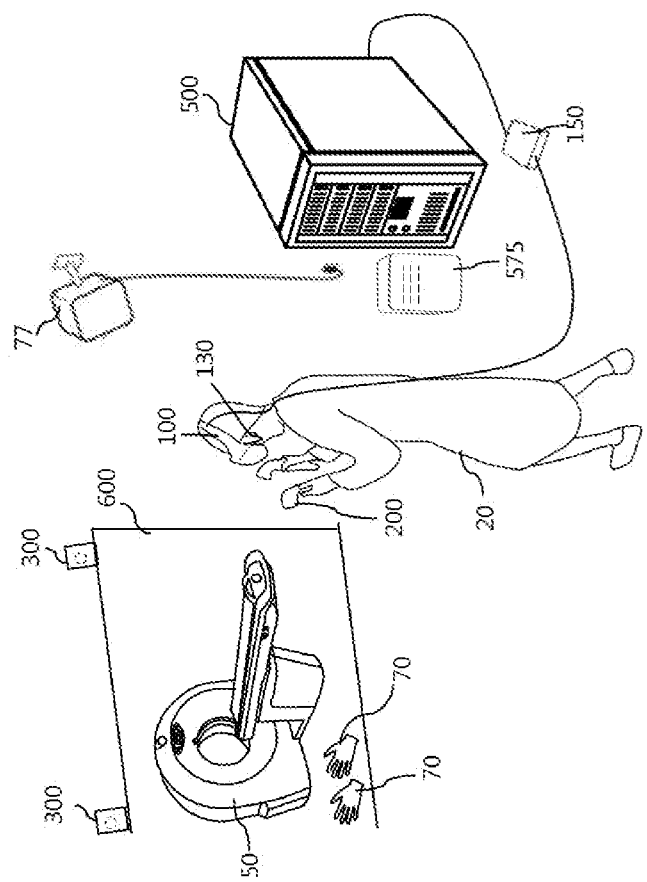
FIG. 16 is a schematic diagram explaining the virtual reality-based radiology practice apparatus of FIG. 2 where the virtual radiography equipment is a CT scanner.

For example, the schematic diagrams of a virtual reality-based virtual radiology practice apparatus when the virtual radiography equipment (50) is a digital X-ray machine are shown in FIG. 12 and FIG. 13. The schematic diagrams of a virtual reality-based virtual radiological practice device when the Virtual radiography equipment (50) is an angiography machine are shown in FIG. 14 and FIG. 15. Also, a schematic diagram of virtual reality-based virtual radiology practice apparatus when the Virtual radiography equipment (50) is a CT scanner is shown in FIG. 16.

The earphones (130) that are connected to the HMD head-mounting unit (100) outputs sound signals that are received from the main server (500) via the HMD controller (150) and these sound signals are also transmitted from the main server (500) to the speaker unit (575), which can be heard through the speaker unit (575).

The HMD hand-mounted unit (200) transmits the hand movement signals that are detected by the hand movement detection unit (210) to the main server (500) through the HMD controller (150) and the vibration generating unit (230) is also driven according to the vibration control signals received from the main server (500) via the HMD controller (150).

The hand movement detection unit (210) and the head movement detection unit (110) detect the hand movement signals and the head movement signals in synchronization with the generation of infrared rays from the base station unit (77).

The main server (500) sets the actor (moveable part) of the virtual radiography equipment (50) intended by the practice to moved using the received hand movement signals, head movement signals, and practiser's image. The main server (500) generates an image that moves the actor in correspondence with the hand movement signals and transmits it to the HMD head-mounting unit (100) and the display unit (600).

Alternatively, the main server (500) may select a specific switch in the setting unit of the virtual radiography equipment (50) or the setting unit of virtual radiology practice apparatus using the received hand movement signals, input button signals, head movement signals, and practiser's image. And the main server (500) may get the selected switch to start or end using the received hand movement signals, input button signals, head movement signals, and practiser's image. These switches can be toggle switches.

Figure 4:
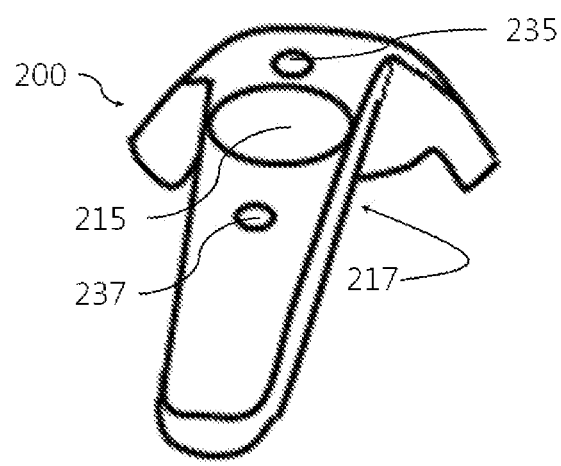
FIG. 4 is an example of the HMD hand-mounted unit of FIG. 2.

FIG. 4 is an example of the HMD hand-mounted unit of FIG. 2.

The HMD hand-mounted unit (200) of FIG. 2 is a commercial product and includes an FBLR (Forward/Backward/Left/Right) button (215), a power on/off button (237), and a menu button (235) on its upper surface, and a trigger button (217) on a side of the lower surface. The FBLR button (215), the power on/off button (237) and the menu button (235) can be operated using the thumb and the trigger button (217) can be operated using the index finger.

Figure 5:
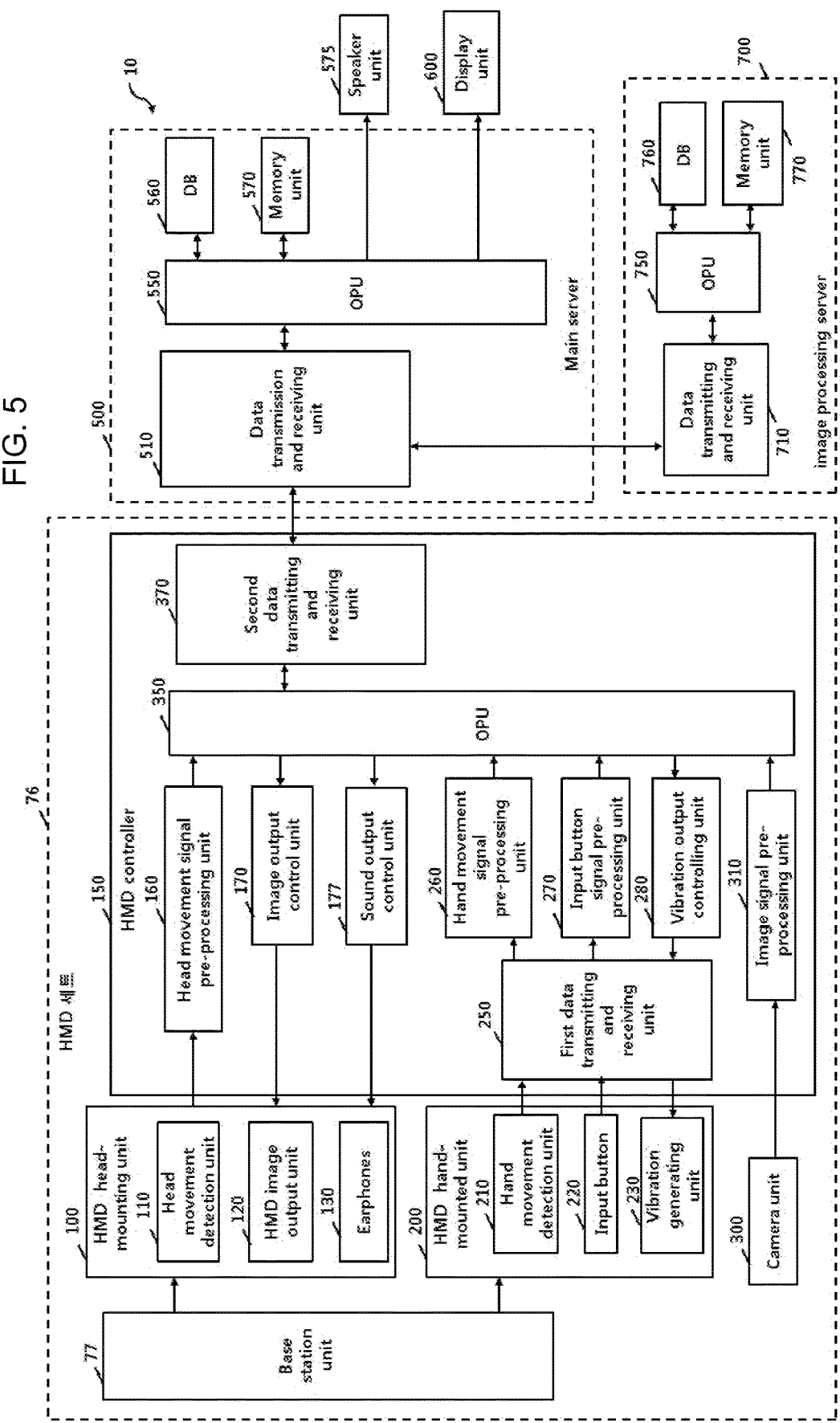
FIG. 5 is a block diagram illustrating a configuration of virtual reality-based radiology practice apparatus of FIG. 2.

FIG. 5 is a block diagram for explaining the configuration of the virtual reality-based virtual radiology practice apparatus of FIG. 2, which includes a base station unit (77), a HMD head-mounting unit (100), a HMD controller (150), a HMD hand-mounted unit (200), a main server (500), a speaker unit (575), a display unit (600), and a medical image processing server (700).

The base station unit (77) comprises one or more base stations for outputting infrared rays at a specific period. The head movement detection unit (110) and the hand movement detection unit (210) detect signals in synchronization with the infrared rays emitted from the base station unit (77).

The HMD head-mounting unit (100) provides the practiser (20) with a virtual practice environment. It is a means for detecting the head movement signals that can grasp the direction of the face of the current practiser and transmitting it to the main server (500) through the HMD controller (150). The HMD head-mounting unit (100) includes a head movement detection unit (110), an HMD image output unit (120), and earphones (130).

A head movement detection sensor (not shown) is mounted on the HMD head-mounting unit (100) to detect the head movement signals and to transmit the detected head movement signals to the head movement signal pre-processing unit (160) of the HMD controller (150). The head movement signals can be made up of the head position signals (X, Y, Z) and the angle of head rotation signals. Here, the head movement detection sensor may be a gyro sensor, an acceleration sensor, or the like.

The HMD image output unit (120) outputs the image signals that are received through the image output control unit (170).

The earphones (130) output the sound signals that are received via the sound output control unit (177). The sound outputted through the earphones (130) may be mainly lecture data (sound) or the like.

The HMD hand-mounted unit (200) includes a hand movement detection unit (210), an input button (220), and a vibration generating unit (230). The HMD hand-mounted unit (200) detects the hand movement signals of the practiser (20) using the hand movement detection unit (210), moves the hand movement indicator (70) that is displayed on the virtual practice environment (image) to perform virtual practice. The HMD hand-mounted unit (200) also allows the practiser (20) as using the input button to select a specific switch or the like in the setting unit of the Virtual radiography equipment (50) or the virtual radiology practice apparatus that is displayed on the virtual image. The HMD hand-mounted unit (200) uses vibration generating unit (230) to perceive through vibration the feeling when the practiser (20) contacts a specific object or catches a specific object on the virtual practice environment.

The hand movement detection unit (210) is equipped with a hand movement detection sensor (not shown) to detect the hand movement signals and wirelessly transmit the hand movement signals to the hand movement signal pre-processing unit (260) via the first data transmission and receiving unit (250) of the HMD controller (150). Here, the hand movement signals can be composed of the hand signals (X, Y, Z) and the angle of hand signals. Here, the hand movement detection sensor may be a gyro sensor, an acceleration sensor, or the like.

The input button unit (220) includes an FBLR button (215), a trigger button (217), a power on/off button (237), a menu button (235), and the like in the HMD hand-mounted unit (200). The input button unit (220) may be used in the movement of the practiser (20) (e.g., when the practiser (20) moves out of the virtual imaging room on the virtual practice environment). Also the input button unit (220) may be used to select a specific switch in the setting unit of the virtual radiography equipment (50) or the virtual radiology practice apparatus. The trigger button (217) is a button that the practiser selects when trying to catch a virtual object or the like. In other words, the practiser keeps pressing the trigger button while holding the virtual object, so the movement indicator is holding the virtual object during that time.

The vibration-generating unit (230) generates vibrations according to the driving signals of the vibration-generating unit (230) that are received from the vibration output controlling unit (280) of the HMD controller (150) through the first data transmission and receiving unit (250). The vibration-generating unit (230) is located in the area where the palm contacts the HMD hand-mounted unit (200).

The camera unit (300) captures a motion image of the practiser (20) and outputs a practiser's image, that is, a position tracking (motion tracking) image of a practiser, to the image signal pre-processing unit (310) of the HMD controller (150). The camera unit (300) is mounted on the display unit (600) and the sites where the motion of the practiser (20) can be captured. The camera unit (300) may include one or more cameras, preferably two cameras. The camera unit (300) is a position tracking (motion tracking) sensing unit. In some cases, the camera unit (300) may be a depth camera.

HMD controller (150) includes the head movement signal pre-processing unit (160), the image output control unit (170), sound output control unit (177), the hand movement signal pre-processing unit (260), the input button signal pre-processing unit (270), the vibration output controlling unit (280), and the image signal pre-processing unit (310).

In FIG. 2, the connection between the HMD controller (150) and the HMD head-mounting unit (100) is made by wire, while the connection between the HMD controller (150) and the HMD hand-mounted unit (200) is wireless, and the HMD controller (150) and the main server (500) are connected by wire. However, it is noted that it is not intended to limit the invention to those. That is, the connection between the HMD controller (150) and the HMD head-mounting unit (100) may be made wirelessly, or the connection between the HMD controller (150) and the main server (500) may be wireless.

The head movement signal pre-processing unit (160) amplifies the head movement signals detected by the head movement detection unit (110), removes noises, converts the signals into digital signals, and outputs the digitized head movement signals to the OPU (Operating Processing Unit) (350) of the HMD controller (150).

The image output control unit (170) receives the image signals and the image output control signals from the OPU (350) of the HMD controller (150) and controls the HMD image output unit (120) to output the image signals.

The sound output control unit (177) receives the sound signals and the sound output control signals from the OPU (350) of the HMD controller (150) and controls the earphones (130) to output the sound signals.

The hand movement signal pre-processing unit (260) receives the hand movement signals, through the first data transmitting and receiving unit, which is detected by the hand movement detection unit (210), amplifies the signals or removes noises, converts the signals into digital signals, and outputs the digitized head movement signals to the OPU (350) of the HMD controller (150).

The input button signal pre-processing unit (270) receives input signals from the input button unit (220) through the first data transmission and receiving unit (250), converts the input signals into digital signals, and transmits the digitized signals to the OPU (350) of the HMD controller (150).

The vibration output controlling unit (280) generates the signals for driving the vibration generating unit (230) in accordance with the vibration output control signals received from the OPU (350) of the HMD controller (150) and transmits the signals (namely, vibration generating unit drive signals) to the vibration generating unit (230) through the first data transmission and receiving unit (250).

The image signal pre-processing unit (310) converts the practiser's images received from the camera unit (300), that is, the practiser's position tracking (motion tracking) images into a digital signal and transmits the digitized signals to the OPU (350) of the HMD controller (150).

The OPU (350) receives head movement signals, hand movement signals, input button signals, and practiser's images (practiser's position tracking images), converts them into the signals to be transmitted to the main server (500), and transmits the signals to the main server (500) through the second data transmission and receiving unit (370). In addition, the OPU (350) controls the image signals and sound signals received from the main server (500) to be output to the earphones (130) and the HMD image output unit (120) through the image output control unit (170) and sound output control unit (177).

That is, when the base station unit (77) constantly emits an infrared signal, the infrared detection sensor (not shown) of the HMD head-mounting unit (100) detects the infrared signal. When the infrared signal is detected, the head movement signals that are detected by the head movement detection unit (110) are transmitted to the head movement signal pre-processing unit (160) of the HMD controller (150). The head movement signal pre-processing unit (160) preprocesses the head movement signals and transmits the preprocessed head movement signals (or the head movement signals and the infrared signals) to the main server (500) through the OPU (350) and the second data transmission and receiving unit (370). The infrared detection sensor (not shown) of the HMD hand-mounting unit (200) also detects the infrared signal. When the infrared signal is detected, the hand movement signals that are detected by the hand movement detection unit (210), are transmitted to the hand movement signal pre-processing unit (260) of the HMD controller (150) through the first data transmission and receiving unit (250). The hand movement signal pre-processing unit (260) preprocesses the hand movement signals and transmits the preprocessed hand movement signals (or the hand movement signals and the infrared signals) to the main server (500) through the OPU (350) and the second data transmission and receiving unit (370).

The main server (500) is responsible for overall control of the virtual radiology practice apparatus (10).

The main server (500) receives hand movement signals, input button signals, and a practiser's image, and sets the actor of the virtual radiography equipment (50) to be moved according to these signals, generates and outputs images that move the set actor according to the hand movement signals.

The main server (500) reads a virtual patient (30) set by a user and displays the virtual patient (30) on the display unit (600). The virtual patient (30) is a patient having a problem with a specific organ or tissue, and the main server (500) receives mesh data related to a specific organ or tissue generated by the medical image processing server (700), applies the mesh data to the virtual patient (30), and displays the mesh data.

The main server (500) includes a data transmission and receiving unit (510), an OPU (550), a database (560), and a memory unit (570).

The data transmission and receiving unit (510) is a means for transmitting a signal received from an HMD controller (150) to the OPU (550). In some cases, the data transmission and receiving unit (510) may be omitted.

The OPU (550) determines and displays the view (viewpoint) of the virtual radiography equipment (50) and the image containing the virtual patient (30) according to the head movement signals. The OPU (550) determines the position of the user's hands using the practiser's images of the camera unit (300), i.e., the practiser's position tracking images, and displays the hand-shaped hand movement indicator (70) on the image in line with the position of the hand. The OPU (550) then moves the hand movement indicator (70) according to hand movement signals.

If the hand movement indicator (70) on the image contacts the actor (movable part) of the virtual radiography equipment (50), then the OPU (550) recognizes that the practiser (user) is holding the actor in the hands (two hands or one hand). If the hand movement indicator on the image is moved in contact with the actor, the OPU (550) generates an image to get the actor move according to the movement of the indicator, and transmits the image to the HMD head-mounting unit (100) and the display unit (600). At this time, if the indicator is in contact with the actor, the OPU (550) generates vibration output control signals and transmits them to the HMD controller (150) through the data transmission and receiving unit (510).

In addition, if an input button signals are received, the operating processing unit (550) recognizes a specific switch selected by the user among the plurality of switches in the setting unit of the virtual radiology practice apparatus (10) that are displayed in the HMD head-mounting unit (100) and the display unit (600) or the setting unit of the virtual radiography equipment (50). That is, if the input button signals are received, the operating processing unit (550) detects the switch selected by the user through the image that are received from the camera unit (300), and recognizes that the detected switch has been pressed.

Here, many switches of the setting unit of the virtual radiology practice apparatus (10) or the setting unit of the virtual radiography equipment (50) are toggle switches. When the switch is pressed for the first time, it is turned on. Press it again to turn off the switch.

That is, using the input button signals, and the practiser's image of the camera unit (300), the operating processing unit (550) selects a specific switch in the setting unit of the virtual radiography equipment (50) or the virtual radiology practice apparatus, and causes the operation of the selected switch to start or end.

The database (560) stores various virtual radiography equipment images and various virtual patient images.

The memory unit (570) stores the signals received from the operating processing unit (550). It is also used for temporary storage of data during operation in the operating processing unit (550).

The speaker unit (575) sends out sound signals that are received from the operating processing unit (550) of the main server (500). The sound signals that are output from the operating processing unit (550) are the same as those that are output from the earphones (130).

The display unit (600) is a display unit for viewing a trainee (practiser) or a trainer and sends out the image signals that are received from the operating processing unit (550) of the main server (500). The image signals that are output from the display unit (600)) are the same as those that are output from the HMD image output unit (120)

The image processing server (700) receives the medical image data (MRI/CT scan data) from the main server 500 (I.e., from the operating processing unit (550) to the data transmission and receiving unit (510) of the main server (500)), divides the image of the medical image data using the deep artificial neural network structure, and computes organ or tissue mesh data (surface information/polygon mesh) using the segmented images and transmits the calculated organ or tissue mesh data to the main server (500). The medical image data (MRI/CT scan data) is a data obtained from the patient.

The image processing server (700) contains a data transmission and receiving unit (710), an operating processing unit (OPU) (750), a DB (760), and a memory unit (770).

The operating processing unit (750) receives the medical image data (MRI/CT scan data) from the main server (500) via the data transmission and receiving unit (710), divides the image of the medical image data using the deep artificial neural network structure, and computes organ or tissue mesh data (surface information) using the segmented images. That is, the operating processing unit (750) converts the medical image data (MRI/CT) obtained from the patient into three-dimensional vectors data, inserts them into a deep artificial neural network, extracts the features, calculates weights for the feature vectors, classifies the vectors according to the weights of the vectors (that is, after classifying which organ/tissue the vector is corresponding to), and outputs the three-dimensional vector data (volume data, volumetric data) for each classification as the result. The operating processing unit (750) extracts vertices (points) of the voxels that are in contact with empty space (voxel with a value of 0) out of the 3-dimensional vectors (volume information) that are extracted from the deep artificial neural network, then creates the edges (lines) by connecting these points, creates faces based on these lines, creates a polygon mesh by connecting the faces to each other and transmits the mesh data (surface information) to the main server (500).

The main server (500) receives the mesh data (surface information) and converts the 3D model of the specific part of the virtual patient into the mesh data (surface information) of the 3D model. For example, the server converts a 3D model that shows the oral part inside the virtual patient into the mesh data (3D model) received from the image processing server (700).

In the setting unit of the virtual radiology practice apparatus (10), lecture mode, tutorial mode, exercise mode, practice mode, radiotherapy device mode, and radiography equipment mode can be set.

Tutorial mode is a mode to learn how to use the virtual radiology practice apparatus (10).

Here, in the exercise mode, instead of a virtual patient (30), a virtual mannequin (not shown) is displayed, and in some cases, practice can be performed without displaying a virtual mannequin (not shown). On the other hand, in the practice mode, the virtual patient (30) is displayed, and the practice can be performed on the virtual patient (30).

In the settings part of the virtual radiography equipment (50), the user can set the age/gender of the patient, type of photography (or therapy) and the sites that need to be photographed (or treated), and set to generate arbitrary settings for them.

For example, oral radiography is practiced as follows.

First, the practiser (20) can select a practice mode and a radiography equipment mode in a setting unit of the radiology practice equipment (10) using the input button (220) of the HMD hand-mounted unit(200) and select oral radiography equipment among the radiography equipment.

And, in the setting unit of the virtual radiography equipment (50), the practiser (20) can set the age/gender of the patient, type of photography (or therapy) and the sites that need to be photographed (or treated), using the input button (220) of the HMD hand-mounted unit (200) or can select auto setup.

On the image of the HMD image output unit (120) and the display unit (600), when the virtual patient (30) enters the imaging room, using the HMD hand-mounted unit 200, the practiser (20) displays the hand movement indicator (70) on the image (i.e., a virtual practice environment image), checks whether the virtual patient is wearing a metal jewelry, a brace or prosthesis that can affect the imaging work using the hand movement indicator (70), causes the virtual patient (30) to be seated at the virtual radiography equipment (not shown) chair, and adjusts the angle of the head of the virtual patient (30) according to the imaging method to be used.

On the above image, the practiser (20) opens the mouth of the virtual patient (30) using the hand movement indicator (70), selects an appropriate film and tool suitable for the imaging work and imaging method using the input button (220) of the HMD hand-mounted unit (200), picks up the selected film using the hand movement indicator (70) and places it in the correct position in the patient's mouth and fixes it, using the selected assistive tools. Here, the mouth portion of the virtual patient (30) is a 3D image to which the mesh data of the 3D model is applied to the mouth portion image generated in the medical image processing server (700).

practiser adjust the position and angle of the oral radiography equipment according to the imaging site and imaging method, and out of the imaging room, press the imaging button in the setting unit of the virtual radiography equipment.

After removing the film from the mouth of the virtual patient (30), the film is developed into images and the imaging results are checked.

Figure 6:
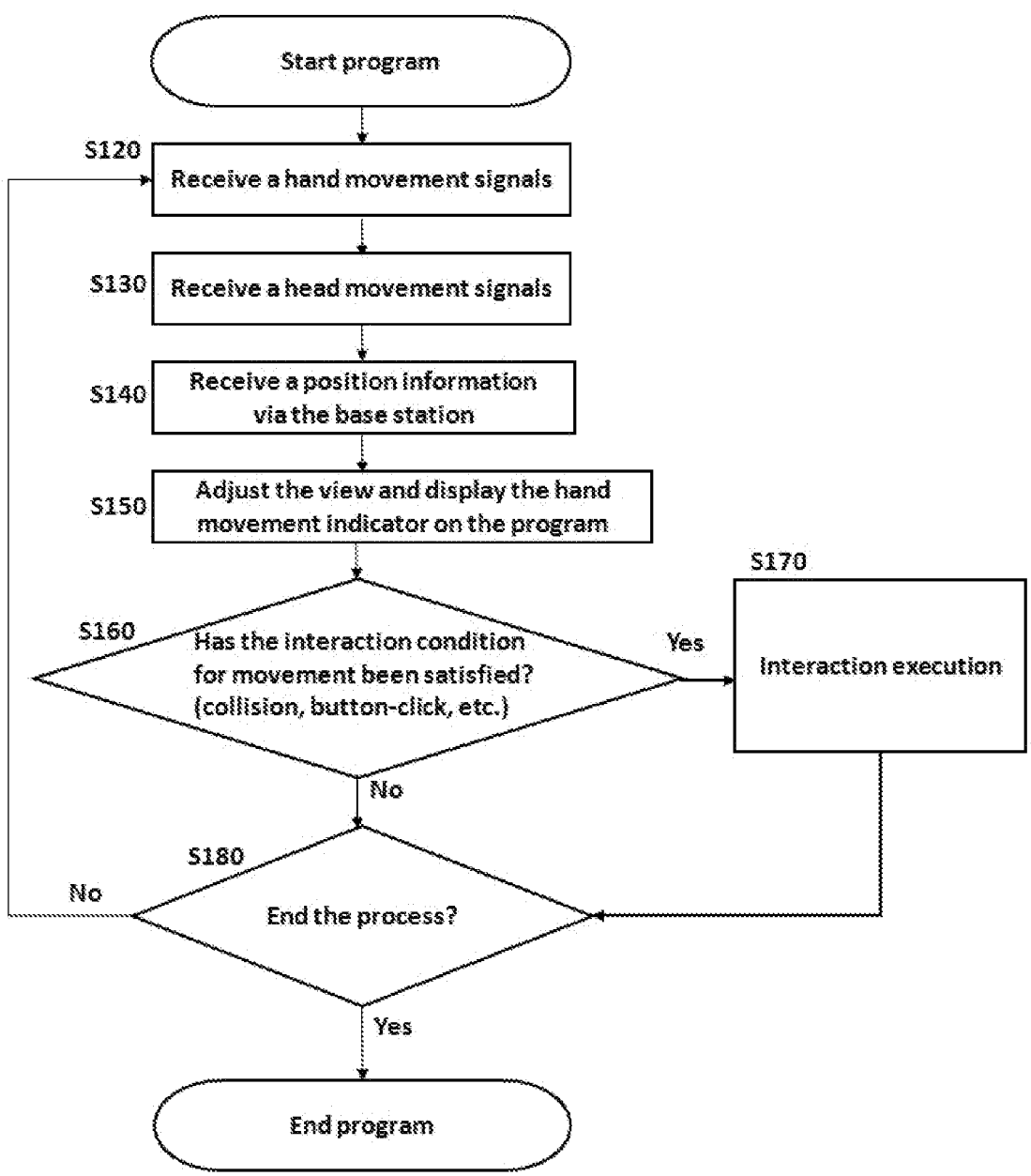
FIG. 6 is a flowchart of a basic operation of the main server of FIG. 5.

FIG. 6 is a flowchart illustrating a basic operation of the main server's operating processing unit in FIG. 5.

As the Signal receiving step, from the HMD controller (150), the operating processing unit (550) of the main server (500) receives hand movement signals (S120), head movement signals (S130), and position tracking (motion tracking) image signals (i.e., the practiser's image signals) according to the practiser's motion (S140). Here, the hand movement signals, the head movement signals, and the position tracking image signals are detected according to the infrared signal of the base station unit (77). In particular, the position tracking image signal is not a moving image but image signals the camera unit (300) shoots when an infrared signal is detected.

As the view adjustment and hand movement indicator displaying step, the operating processing unit (550) of the main server (500) determines the view of the practiser according to head movement signals, adjusts and outputs an image of the preset virtual practice environment according to the field of view of the practiser, and displays the hand movement indicator (70) on the image of the virtual practice environment at the position according to the hand movement signals or at the hand position according to the position tracking image signal.

As the step of checking interaction condition for movement, the operating processing unit (550) determines whether the input button signals received through the input button (220) have been input, it also determines whether the hand movement indicator (70) is in collision with the virtual radiography equipment (50) or the like (S160). If the input button signals have not been inputted and the hand movement indicator (70) have not collided (contacted) the virtual radiography equipment (50) or the like, the process proceeds to the step of determining whether or not to end the process (S180).

As the Interaction execution step, if input button signals are input in the step of checking interaction condition for movement, the operating processing unit (550) performs an operation according to the input button signal. If the hand movement indicator (70) is in collision with the virtual radiography equipment (50) or the like in the step of checking interaction condition for movement, the operating processing unit generates and transmits vibration output control signals to the HMD controller (150) (S170).

As the step of determining whether or not to end the process, if the end signal according to the end button is received, or if the end signal is received by the end of the practice time, the process ends. Otherwise, the process returns to the signal receiving step.

Figure 7:
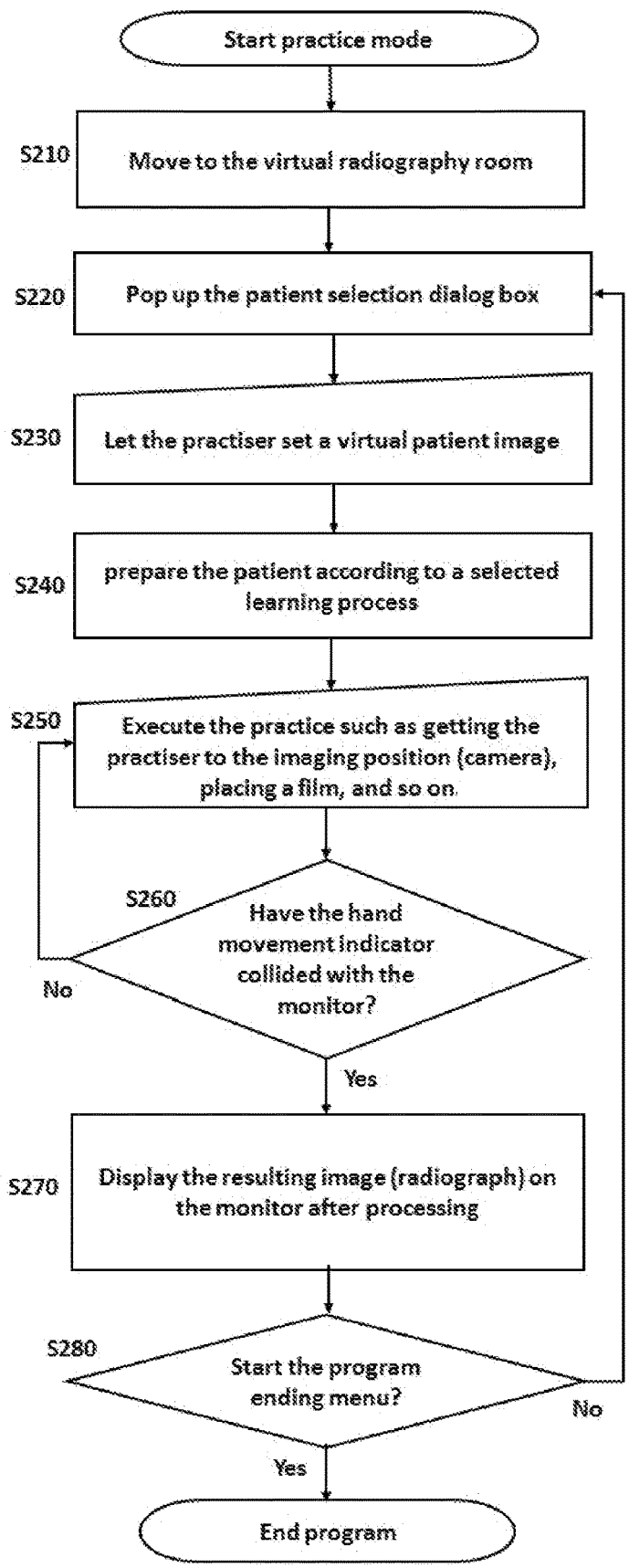
FIG. 7 is a flowchart for explaining the operation of the main server's operating processing unit of FIG. 5 in a practice mode using virtual radiography equipment.

FIG. 7 is a flowchart for explaining the operation of the main server's operating processing unit (FIG. 5) in a practice mode using radiography equipment.

As the step of moving to the virtual lab, the practiser moves to the virtual laboratory (radiography room) so that the operating processing unit (550) of the main server (500) outputs the virtual laboratory (radiography room) to the image of the virtual practice environment (S210).

As the virtual patient setting step, the operating processing unit (550) causes a patient selection dialog box to be displayed (S220), causes a virtual patient image set by the practiser (user) to be displayed (S230), causes the virtual patient to be prepared for imaging or treatment according to a learning process that has been set by the practiser (S240). For example, the practiser checks whether the virtual patient is wearing metal jewelry, a brace or prosthesis that can affect the imaging work, causes the virtual patient (30) to be seated in the of the virtual radiography equipment (not shown) chair, and adjusts the angle of the head of the virtual patient (30) according to the imaging method to be photographed.

As the practice execution step, the practiser places the film on the imaging site of the virtual patient who has been moved to the position for imaging according to the movement of the hand movement indicator of the practiser, adjusts the position and angle of the virtual radiography equipment, and runs the virtual radiography equipment to proceed with virtual image-shooting exercises (S250).

That is, the practiser moves the camera to the position for imaging, chooses the right film for filming and assistive device for the imaging method, picks up the selected film using the hand movement indicator (70), positions the film in the virtual patient's imaging site (e.g., inside of the mouth of a virtual patient) to fix it using the selected assistive device, adjusts the position and angle of the virtual radiography equipment according to the location and the imaging method, gets out of the imaging room, and presses the imaging button in the setting unit of the virtual radiography equipment to perform the radiography practice.

As the step of checking the imaging result, the operating processing unit (550) checks whether the hand movement indicator (70) has collided with the virtual result screen monitor by the practiser (S260) in order to see the image-shooting result after the practice execution step. If the hand movement indicator (70) has not collided with the virtual result screen monitor (not shown), the practice is not finished yet so the operating processing unit (550) proceeds to the practice execution step.

As the step of outputting the results of the virtual practice, if the hand movement indicator (70) has collided with (or contacted) the virtual result screen monitor (not shown) in the step of checking the imaging result, the film removed from the virtual patient (30) is displayed on the virtual result screen monitor after being developed into images (not shown) according to the hand movement indicator (70) (S280).

As the step of determining whether or not to end the process, if an end signal is received from the pressing of the end button at the settings part of the virtual radiography equipment (50) or the settings part of the virtual radiology practice apparatus or if the end signal is received due to completion of the practice time, the process ends. If not, it returns to the virtual patient setting step.

Figure 8:
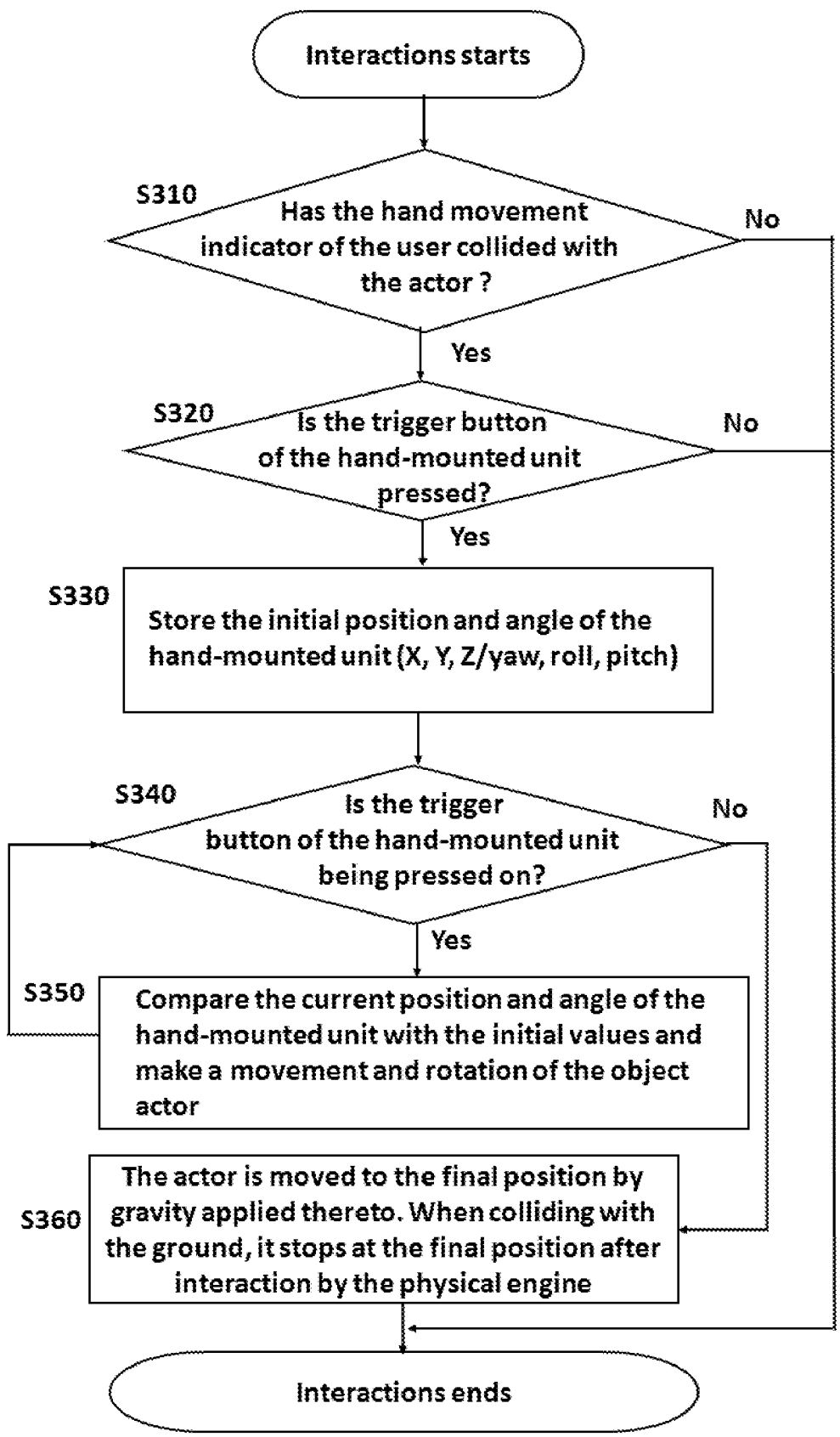
FIG. 8 is a flowchart for explaining the operation of the main server's operating processing unit in FIG. 5 when catching an object in the virtual practice environment.

FIG. 8 is a flowchart for explaining the operation of the main server's operating processing unit in FIG. 5 when the practiser catches an object in the virtual practice environment.

As the step of checking collision with a actor, the operating processing unit (550) of the main server (500) determines whether the hand movement indicator (70) of the practiser has collided with a actor (e.g., a specific actor of the virtual radiography equipment (50)) of the object (S310) and if there is no collision (contact), the process ends. Here, the actor of the object is the movable part of the object.

As the step of checking reception of trigger signal, when the operating processing unit (550) determines in the step of checking collision with a actor that the hand movement indicator (70) collided with the actor of the object, the operating processing unit (550) checks whether trigger signal has been received from the trigger button (217) of the HMD hand-mounted unit (200) (S320), and, if the trigger signal has not been received, the operating processing unit (550) determines that the practiser has not been trying to catch the object, and ends the process.

As the Hand movement signals receiving step, if a trigger signal has been received in the step of checking reception of trigger signal, it is determined that the practiser has been trying to catch the object, the hand movement signals, i.e., the initial position and angle value of the hand are received from the hand movement detection unit (210) of the HMD hand-mounted unit (200) and stored in the memory unit (570) (S330).

As the step of checking re-reception of trigger signal, the operating processing unit (550) determines whether the trigger signal is being received again according to repeatedly pressing the trigger button of the HMD hand-mounted unit (200) by the practiser (S340). If the trigger signals are not being received, the process goes to the step of moving to the final position.

As the step of moving the actor, if trigger signals are being received in the step of checking re-reception of trigger signal, the operating processing unit (550) receives the current hand movement signals, i.e., the current position and the current angle value of the hand from the hand movement detection unit (210) of the HMD hand-mounted unit (200), and compares the current hand movement signals with the previous hand movement signals, i.e., the previous position and the previous angle value of the hand, and moves and rotates the actor of the virtual object according to the comparison result (S350).

As the step of moving to the final position, the actor of the virtual object gets moved to the final position by gravity applied thereto. When the virtual object collides with the ground, it interacts with the physical engine and stops at the final position (S360).

Figure 9:
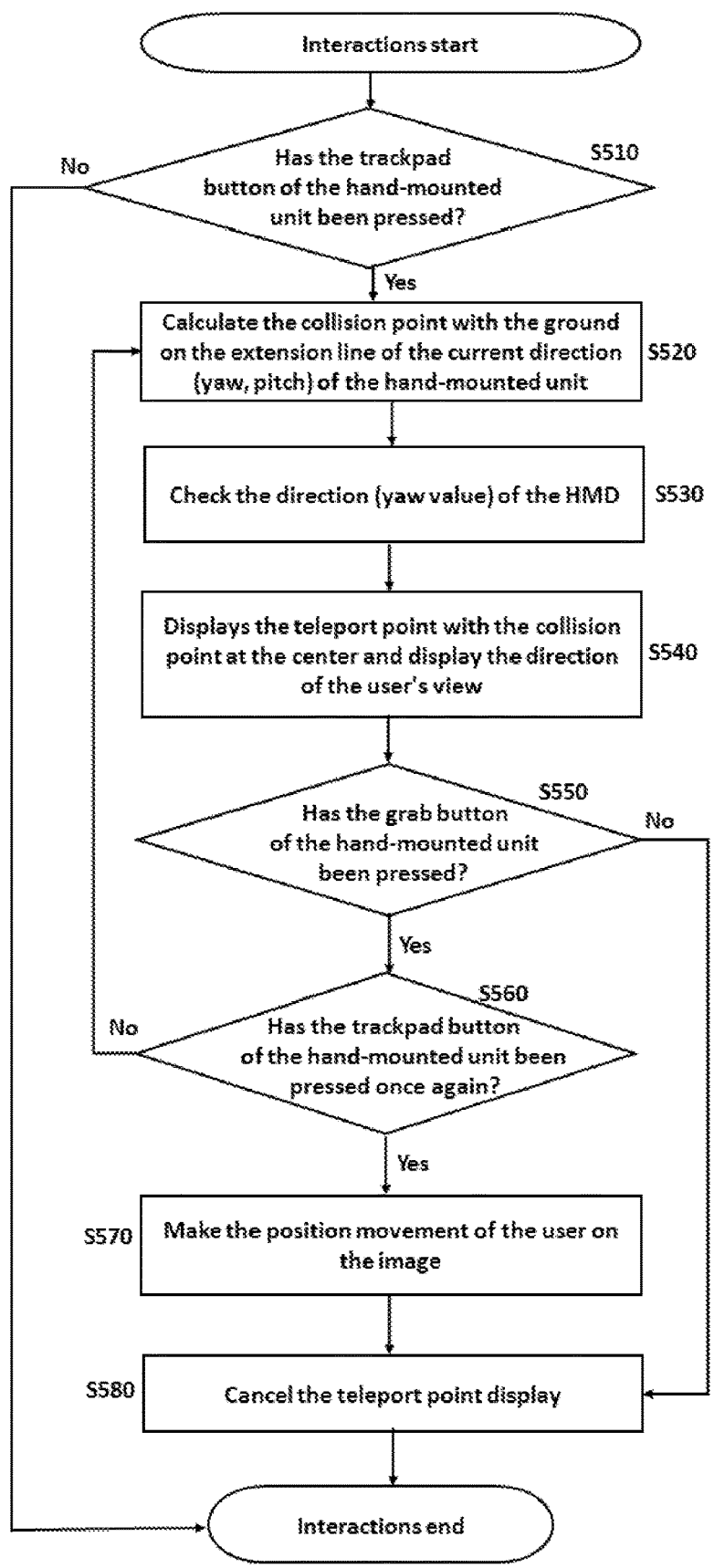
FIG. 9 is a flowchart illustrating a process of teleportation (location shifting of the practiser) of the main server's operating processing unit in FIG. 5 in the virtual practice space.

FIG. 9 is a flowchart showing the process of teleporting (practiser's position movement) in the virtual practice space in the main server's operating processing unit in FIG. 5.

As the step of checking reception of FBLR button signal, the operating processing unit (550) of the main server (500) determines whether or not receives the FBLR (Forward/Backward/Left/Right) button signals generated according to press the FBLR button (trackpad) (215) of the HMD hand-mounted unit (200), and if the FBLR button signals is not received, the process ends.

As the step of calculating collision point with ground, if the FBLR button signals are being received in the the step of checking reception of FBLR button signal, the operating processing unit (550) receives the current hand movement signals, i.e., the current position and the current angle value of the hand from the hand movement detection unit (210) of the HMD hand-mounted unit (200), and the collision point with the ground is calculated on the extension line of the current direction according to the current position and the current angle of the hand (S520).

As the step of receiving the head movement signals, the operating processing unit (550) receives the head movement signals, i.e., the current position and the current angle of the head from the HMD controller (150), and determines the heading direction of the practiser's head (S530).

As the step of displaying teleport point based on collision point, the operating processing unit (550) displays the teleport point based on the collision point and displays the direction of the user's view (S540). For example, the operating processing unit (550) displays the teleport point with the collision point at the center and displays the direction of the user's view.

As the step of checking reception of grab button signal, the operating processing unit (550) determines whether or not the receives grab button signals generated according to press the grab button of the HMD hand-mounted unit (200) (S550). If the grab button signals have been received, it proceeds to the step of cancelling the teleport point display.

As the step of checking re-reception of FBLR button signal, when the grab button signals have not been received in the step of checking reception of grab button signal, the operating processing unit (550) determines whether or not the FBLR button signals generated according to press the FBLR button (track pad) (215) of the HMD hand-mounted unit (200) have been received again (S560). If the FBLR button signals have not been received again, then it returns to the step of calculating collision point with the ground.

As the position movement execution step, the operating processing unit (550) generates an image with the movement of direction and position of the practiser (user) to the user's viewing direction and the teleport point as shown in the step of displaying teleport point based on collision point, and transmits the generated image to the HMD controller (150) (S570).

As the step of cancelling the teleport point display, the teleport point displayed in step of displaying teleport point based on collision point is cancelled (S580).

Figure 10:
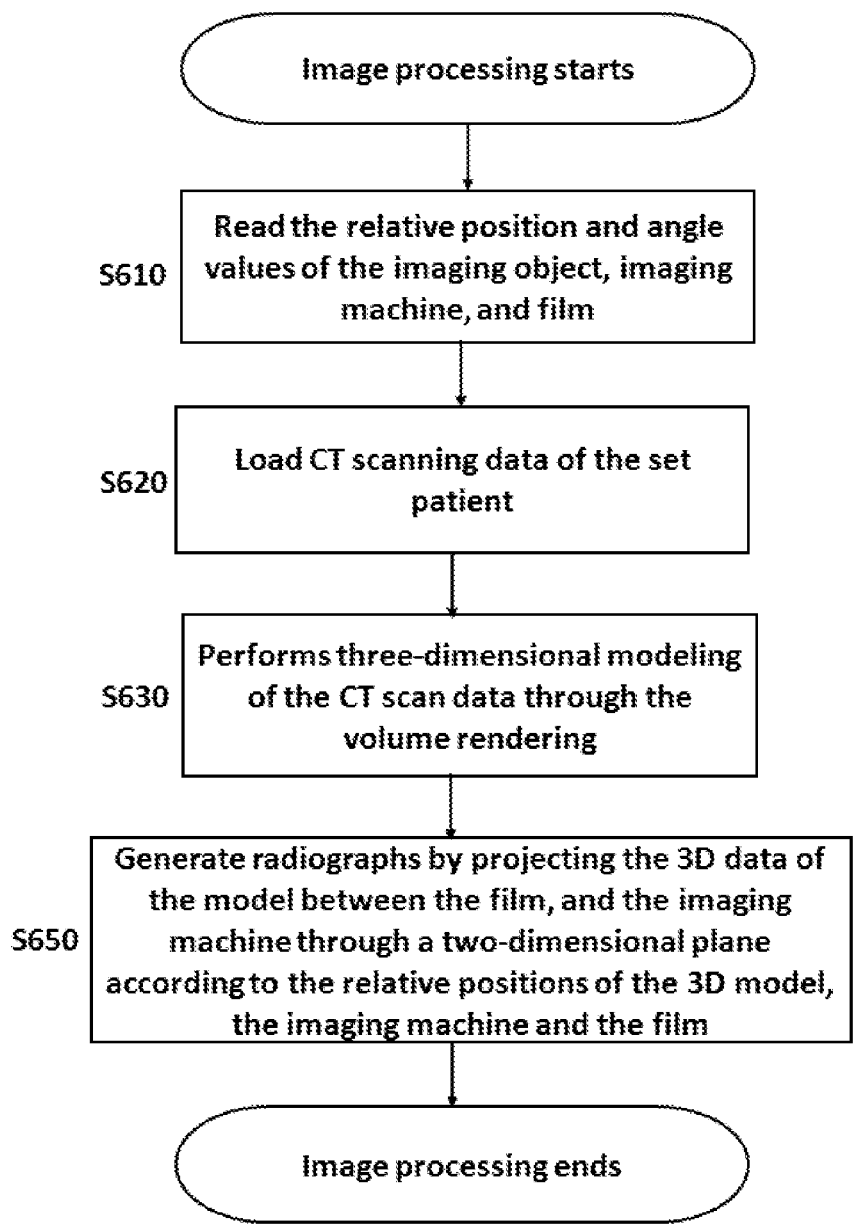
FIG. 10 is a flowchart illustrating an example of a calculation process of a radiation image-shooting result screen in a virtual practice using the virtual radiology practice apparatus of the present invention.

FIG. 10 is a flowchart illustrating an example of a calculation process of a radiation image-shooting result screen in a virtual practice using the virtual radiology practice apparatus of the present invention.

FIG. 10 illustrates a process of generating a results screen through CT scan data.

As the step of reading the relative position of the imaging object, imaging machine, and film, the operating processing unit (550) of the main server (500) reads the relative position and angle values of the imaging object, imaging machine, and film (S610).

As the CT scan data loading step, the operating processing unit (550) reads CT scan data of the set patient from the database 560 (S620).

As the 3D (Three-dimensional) modeling step of CT scan data, the operating processing unit (550) performs three-dimensional modeling of the CT scan data through the volume rendering (S630).

As the Radiographic image generation step, according to the relative positions of the 3D model, the film, and the imaging machine, the 3D data of the model between the imaging machine and the film is projected (transmitted) through a two-dimensional plane to generate radiographs (S650).

Basically, normal 3D graphics consist of mesh and texture. The mesh is data that shows only the outline boundary, and the inside is empty and determines the external shape. In general, a 3D graphic is rendered by drawing a texture (i.e., a picture file) on the mesh.

Unlike this approach, volume rendering is like layering a very thin layer of planar texture. The advantage is that there is information about the interior of an object in the same way that a two-dimensional surface is actually piled up into a three-dimensional structure. However, the drawback is that the system load is high because of the large amount of computation.

For the present invention, in the CT scan data, the plane texture is stacked according to the scan interval, and the space between them is filled up by interpolation to create a 3D model containing all the information inside.

Figure 11:
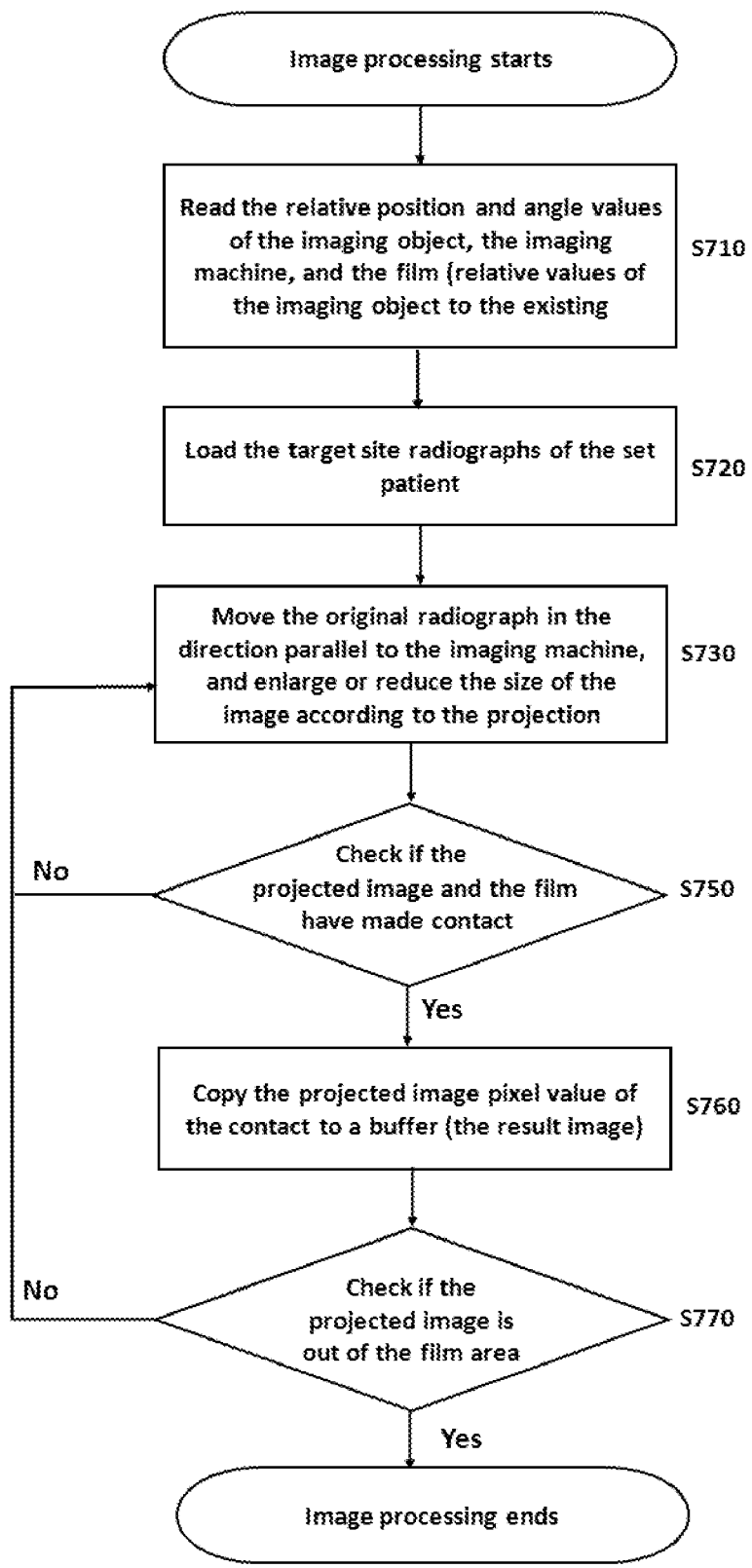
FIG. 11 is a flowchart illustrating another example of the calculation process of the radiation image-shooting result screen in a virtual practice using the virtual radiology practice apparatus of the present invention.

FIG. 11 is a flowchart for explaining an example of the calculation process of the radiation image-shooting result screen in the virtual practice using the virtual radiology practice apparatus of the present invention.

FIG. 11 illustrates a process of generating a result screen based on the existing radiographs.

At the step of reading the relative position of the imaging object, imaging machine, and film, the operating processing unit (550) of the main server (500) reads the relative position and angle values of the imaging object, the imaging machine, and the film (i.e., relative values of the imaging object to the existing radiographs) (S710).

As radiographic loading step, the operating processing unit (550) reads the target site radiographs of the set patient from the database 560 (S720).

As the step of resizing the original radiograph, the operating processing unit (550) projects the original radiograph, which is the target site radiograph, read in the Radiographic loading step, moves it in the direction parallel to the imaging machine, and enlarges or reduces the size of the image according to the projection (S730).

As the step of checking existence of contact point, after the step of resizing the original radiograph, it is checked whether the projected image and the film have made contact (S750). If there is no contact, the process returns to the step of resizing the original radiograph.

As the pixel value storing step, if there is contact at the step of checking existence of contact point, the projected image pixel value of the contact point is copied to a buffer for storing the resulting image (S760).

As the step of checking departure from film area, the operating processing unit (550) determines whether or not the projected image is out of the film area (S770). If not, the process returns to the step of resizing the original radiograph, and if the projected image is out of the film area, the process ends.

In FIG. 11, it is used when there is no CT scan data but there are radiographs for a specific region. It produces wrong result radiograph (for example, an extension of the image) due to inexperienced photographing such as shooting in the same direction but different angle, around the area where the original picture is located.

As described above, according to the present invention, the conventional imaging method using actual radiography equipment and manikin in existing radiology practice is practiced through virtual imaging equipment and various virtual patients in virtual reality. Thus, the problems of existing radiology practice methods related to direct exposure to radiation, high cost of operating a practice lab, and limited practice experience, can be solved.

The present invention relates to virtual reality-based radiology practice apparatus and methods that allow for manipulation of virtual radiography equipment using a HMD hand-mounted unit (200) to perform radiography practice in virtual reality experienced by the user through visual and auditory using the HMD head-mounting unit (100), simulates image-shooting results according to the location and setting of a virtual imaging object and equipment, and outputs results in virtual reality.

The present invention has hardware and software parts. The hardware part includes a HMD head-mounting unit (100) for allowing a user to experience audiovisual virtual reality, a HMD hand-mounted unit (100) for tracking the position and angle of the user's hand, (200) and a main server (500) which is a computer for simulating a virtual reality, and the software part can work with a single application based on a Windows operating system.

That is, the present invention relates to an apparatus and method for implementing radiology practice in virtual reality, which allows the user to experience virtual reality through software rendering virtual reality and HMD, and it provides a way to manipulate the radiography equipment in virtual reality with the HMD hand-mounted unit (200) and conducts x-ray imaging simulations that reflect both virtual imaging equipment and patient imaging settings. It allows for radiology practice implemented in virtual reality by outputting the x-ray image into virtual reality.

As above, this invention has been described by a limited number of embodiments and drawings, but it is not limited to the above embodiments. Various modifications and variations may be made thereto by those with general knowledge of the field in which this invention belongs. Accordingly, this idea of invention should only be understood in accordance with the patent claims listed below, and both its equivalence and equivalent variations fall under the category of the idea of this invention.

INDUSTRIAL APPLICABILITY

The virtual reality-based radiology practice apparatus and method of the present invention is a device for performing virtual radiography practice by manipulating virtual radiography equipment in the virtual radiation practice environment provided on audiovisual virtual reality, and is used as practice equipment for students majoring in medicine, dentistry, and radiology who need to practice radiation.

The invention claimed is:

1. A virtual radiology practice apparatus, comprising:
an HMD (Head Mounted Display) head-mounting device that is configured to be mounted on a head of a practiser, and outputs an image containing virtual radiography equipment to an HMD image output device for virtual radiology practice;
a hand motion device that is configured to be mounted in hands of the practiser and that contains a hand movement detection device detecting hand movement signals of the practiser as the hands of the practiser move to manipulate the virtual radiography equipment on the image;
an HMD controller that receives the hand movement signals from the hand motion device, sends the hand movement signals to a main server, and sends an image received from the main server to the HMD head-mounting device;
the main server, wherein the main server receives the hand movement signals from the HMD controller, moves a hand movement indicator which is a virtual hand of the practiser according to the hand movement signals on the image, and sends the image containing the moved hand movement indicator to the HMD controller; and
an image processing server that receives medical image data consisting of MRI scan data or CT scan data, converts the medical image data into three-dimensional vector data or volumetric data, performs image segmentation of the converted medical image data using a deep artificial neural network structure, classifies vectors according to weights of the vectors, uses the segmented image data to calculate mesh data or surface information data of an organ or tissue by extracting vertices of voxels that are in contact with empty space, and transmits the calculated organ or tissue surface information data or mesh data to the main server for display;
wherein head movement signals, a position tracking image, and the hand movement signals are detected in synchronization with an infrared emission of a base station device disposed apart from the HMD head-mounting device and the hand motion device.

2. The virtual radiology practice apparatus according to claim 1,
wherein the HMD head-mounting device includes earphones for outputting a sound signal received from the main server via the HMD controller, and a head movement detection device that detects head movement of the practiser.

3. The virtual radiology practice apparatus according to claim 2,
wherein the hand motion device includes a trigger button indicating that a virtual object colliding with the hand movement indicator on the image is held or grabbed by the hand movement indicator on the image, and
wherein if a part of the virtual object colliding with the hand movement indicator is an actor of the virtual object, when the main server receives a trigger signal from the trigger button via an HMD control device, the main server controls the actor of the virtual object in the image to move according to the movement of the hand movement indicator.

4. The virtual radiology practice apparatus according to claim 3,
wherein the hand motion device further comprises a vibration generating device for outputting vibration when the hand movement indicator collides with the virtual object on the image.

5. The virtual radiology practice apparatus according to claim 4,
wherein the main server receives the head movement signals from the head movement detection device through the HMD controller, generates an image that changes a viewpoint of the image according to the head movement signals, and sends the changed viewpoint image to the HMD controller.

6. The virtual radiology practice apparatus according to claim 5,
further comprising a camera device for photographing the practiser to generate the position tracking image,
wherein the main server generates an image according to the position tracking image, head movement signals, and the hand movement signals that have been received from the camera device through the HMD controller, and transmits the image according to the position tracking image to the HMD controller.

7. The virtual radiology practice apparatus according to claim 6, wherein the hand motion device further comprises a FBLR (Forward/Backward/Left/Right) button or trackpad, and wherein the main server generates images for the practiser that the practiser in the images moves in a direction according to the head movement signals, and sends the images to the HMD controller.

8. The virtual radiology practice apparatus according to claim 1,
further comprising setting switches that get the practiser to set the virtual radiography equipment or a virtual patient,
wherein the main server generates and displays the virtual patient before implementing virtual practice.

9. The virtual radiology practice apparatus according to claim 8,
wherein on imaging, according to the movement of the hand movement indicator which moves according to the practiser's hand movement signals, the main server arranges a virtual film on an imaging region of the virtual patient who has been moved to a position for imaging, adjusts a position and angle of the virtual radiography equipment, and drives the virtual radiography equipment to proceed with virtual image-shooting exercises, and
wherein after a practice execution, the main server virtually develops the film removed from the virtual patient according to the hand movement indicator if the hand movement indicator has collided with a virtual result screen monitor, and displays a photograph virtually developed from the film on the virtual result screen monitor, as a virtual radiation image-shooting results screen.

10. The virtual radiology practice apparatus according to claim 9,
wherein the main server converts a specific part of the virtual patient into mesh data of a 3D model received from the image processing server, and displays the virtual patient.

11. The virtual radiology practice apparatus according to claim 9,
wherein, when the main server generates the virtual radiation image-shooting results screen, the main server reads relative position and angle values of an imaging object, imaging machine, and film, reads CT scan data of a set patient from a database, performs three-dimensional modeling of the CT scan data through volume rendering, and generates radiographs in which 3D data of a 3D model between the imaging machine and the film has been projected or transmitted through a two-dimensional plane according to relative positions of the 3D model, the film, and the imaging machine.

12. The virtual radiology practice apparatus according to claim 9,
wherein, when the main server generates the virtual radiation image-shooting results screen, the main server reads relative position and angle values of an imaging object, imaging machine, and film, reads target site radiographs of a set patient from a database, projects an original radiograph, which is a target site radiograph, moves a projected original radiograph in a direction parallel to the imaging machine, enlarges or reduces a size of an image of the projected original radiograph, and judges whether a projected photograph and the film have a contact point, and copies a pixel value of the projected photograph into a buffer storing a results photograph if there is a contact point.

13. A driving method of the virtual radiology practice apparatus, comprising:
a practice execution step, wherein on imaging, according to a movement of a hand movement indicator which moves according to a practiser's hand movement signals, an operating processor of a main server arranges a virtual film on an imaging region of a virtual patient who has been moved to a position for imaging, adjusts a position and angle of virtual radiography equipment, and drives the virtual radiography equipment to proceed with virtual image-shooting exercises;
a step of outputting results of a virtual practice, wherein after a practice execution step, the operating processor of the main server virtually develops film removed from the virtual patient according to the hand movement indicator if the hand movement indicator has collided with a virtual result screen monitor, and displays a photograph virtually developed from the film on the virtual result screen monitor; and
between a virtual patient setting step and the practice execution step,
a step in which the operating processor of the main server sends medical image data consisting of MRI scan data or CT scan data to an image processing server;
a step in which the image processing server converts the medical image data into three-dimensional vector data or volumetric data, performs image segmentation of the medical image data using a deep artificial neural network structure, classifies vectors according to weights of the vectors, uses the segmented image data to calculate mesh data or surface information data of an organ or tissue by extracting vertices of voxels that are in contact with empty space, and transmits the calculated organ or tissue surface information data or mesh data to the main server for display;
wherein the hand movement signals are detected in synchronization with an infrared emission of a base station device disposed apart from an HMD head-mounting device and a hand motion device.

14. The driving method of the virtual radiology practice apparatus according to claim 13, further comprising before the practice execution step:
a step of moving to a virtual lab, wherein the operating processor of the main server transmits an image of a virtual radiography room to an HMD image output device via an HMD controller when on the image, the practiser moves to the virtual radiography room; and
the virtual patient setting step, wherein after the step of moving to the virtual lab, the operating processor of the main server displays a patient selection dialog, and transmits a virtual patient image set by the practiser to the HMD image output device via the HMD controller.

15. The driving method of the virtual radiology practice apparatus according to claim 14, further comprising:
a step in which the main server converts received mesh data of a specific part of the virtual patient into mesh data of a 3D model and displays the virtual patient.

16. The driving method of the virtual radiology practice apparatus according to claim 14, wherein the step of outputting the results of the virtual practice comprises:
a step of reading a relative position of an imaging object, an imaging machine, and film, wherein the operating processor of the main server reads the relative position and angle values of the imaging object, imaging machine, and film;

a CT scan data loading step, wherein the operating processor of the main server reads the CT scan data of a set patient from a database;

a 3D modeling step of CT scan data, wherein the operating processor of the main server performs three-dimensional modeling of the CT scan data through volume rendering; and, a radiographic image generation step, wherein according to relative positions of a 3D model, the film, and the imaging machine in the step for loading CT scan data, 3D data of the 3D model between the imaging machine and the film is projected or transmitted through a two-dimensional plane to generate radiographs.

17. The driving method of the virtual radiology practice apparatus according to claim 14, wherein the step of outputting the results of the virtual practice comprises:

a step of reading a relative position of an imaging object, an imaging machine, and film, wherein the operating processor of the main server reads the relative position and angle values of the imaging object, imaging machine, and film;

a radiographic loading step, wherein the operating processor of the main server reads target site radiographs of a set patient from a database;

a step of resizing an original radiograph, wherein the operating processor of the main server projects the original radiograph, which is a target site radiograph, reads in the radiographic loading step, moves it in a direction parallel to the imaging machine, and enlarges or reduces a size of an image of the projected original radiograph;

a step of checking an existence of a contact point, wherein after the step of resizing the original radiograph, the operating processor of the main server judges whether a projected photograph and the film have a contact point, and causes the method to return to the step of resizing the original radiograph if there is no contact point; and a pixel value storing step, wherein if there is a contact point in the step for checking existence of a contact point, the operating processor of the main server copies a pixel value of the projected photograph of the contact point into a buffer storing a results photograph.

18. The driving method of the virtual radiology practice apparatus according to claim 17, further comprising:

a step of checking departure from a film area, wherein the operating processor of the main server checks whether or not a projected image is out of the film area, and returns the method to the step of resizing the original radiograph if the projected image is not out of the film area, and sending the method if the projected image is out of the film area.

* * * * *

UNITED STATES PATENT AND TRADEMARK OFFICE
CERTIFICATE OF CORRECTION

Page 1 of 1

PATENT NO.         : 11,157,131 B2
APPLICATION NO.    : 16/488841
DATED              : October 26, 2021
INVENTOR(S)        : Lee et al.

It is certified that error appears in the above-identified patent and that said Letters Patent is hereby corrected as shown below:

On the Title Page

Item (72) (Inventors)
Please replace the First Inventor's Name with the following:
-- Heesuk LEE --

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*